(12) United States Patent
Kurki et al.

(10) Patent No.: US 11,592,680 B2
(45) Date of Patent: Feb. 28, 2023

(54) APPARATUS AND METHOD FOR MEASURING SPECTRAL COMPONENTS OF RAMAN SCATTERED LIGHT

(71) Applicant: TimeGate Instruments Oy, Oulu (FI)

(72) Inventors: Lauri Kurki, Oulu (FI); Ilkka Alasaarela, Kuusamo (FI)

(73) Assignee: TimeGate Instruments Oy, Oulu (FI)

( * ) Notice: Subject to any disclaimer, the term of this patent is extended or adjusted under 35 U.S.C. 154(b) by 0 days.

(21) Appl. No.: 17/563,705

(22) Filed: Dec. 28, 2021

(65) Prior Publication Data
US 2022/0221730 A1    Jul. 14, 2022

(30) Foreign Application Priority Data
Jan. 8, 2021 (FI) .................... 20215016

(51) Int. Cl.
G02B 27/14 (2006.01)
G01N 21/65 (2006.01)
G02B 6/42 (2006.01)

(52) U.S. Cl.
CPC ........... *G02B 27/141* (2013.01); *G01N 21/65* (2013.01); *G02B 6/4202* (2013.01); *G01N 2201/08* (2013.01)

(58) Field of Classification Search
None
See application file for complete search history.

(56) References Cited

U.S. PATENT DOCUMENTS

| | | | |
|---|---|---|---|
| 4,856,897 A | 8/1989 | Fateley et al. | |
| 6,870,619 B1 * | 3/2005 | Tenhunen | G01J 3/28 356/330 |

(Continued)

FOREIGN PATENT DOCUMENTS

WO    2018048306 A1    3/2018

OTHER PUBLICATIONS

Dorrer, Christophe, "Spatiotemporal Metrology of Broadband Optical Pulses", col. 25, No. 4, IEEE Journal of Selected Topics in Quantum Electronics, XP055758035, ISSN: 1077-260X, DOI: 10.1109/JSTQE.2019.2899019, pp. 1-16, Feb. 12, 2019, 16 pages.
European Patent Office, Extended European Search Report, Application No. 21214266.5, dated Jun. 15, 2022, 6 pages.
(Continued)

*Primary Examiner* — Dominic J Bologna
*Assistant Examiner* — Roberto Fabian, Jr.
(74) *Attorney, Agent, or Firm* — Ziegler IP Law Group, LLC

(57) ABSTRACT

An apparatus for measuring spectral components of Raman-scattered light emitted by target. The apparatus includes: pulsed laser light source to emit light; probe optics to direct light towards target and to collect light scattered by target; optical spectrometer including: input divider to divide collected light into first and second light beams; first spectrograph including input apertures for receiving said light beams and optical disperser to disperse said light beams; second spectrograph comprising input apertures and output apertures; and spatial light modulator to receive dispersed first and second light beams and to selectively provide at least part of at least one of dispersed first and second light beams to input aperture of second spectrograph which reverses dispersion of light beam and focuses light beam to output aperture; detector element to measure spectral components of light beam exiting output aperture. Optical spectrometer further includes delay line(s) line for delaying light beam(s).

17 Claims, 14 Drawing Sheets

(56) References Cited

U.S. PATENT DOCUMENTS

| | | | |
|---|---|---|---|
| 6,996,292 B1 | 2/2006 | Gentry et al. | |
| 2007/0296969 A1* | 12/2007 | Goldstein | G01J 3/14 |
| | | | 356/328 |
| 2010/0238438 A1 | 9/2010 | Frankel | |
| 2013/0342835 A1* | 12/2013 | Blacksberg | G01J 3/2889 |
| | | | 356/318 |
| 2016/0091429 A1* | 3/2016 | Huber | H01S 3/302 |
| | | | 356/301 |
| 2018/0031851 A1 | 2/2018 | Wilcox | |
| 2018/0052099 A1 | 2/2018 | Hill et al. | |

OTHER PUBLICATIONS

Finnish Patent and Registration Office, Search Report, Application No. 20215016, dated Apr. 20, 2021, 2 pages.

\* cited by examiner

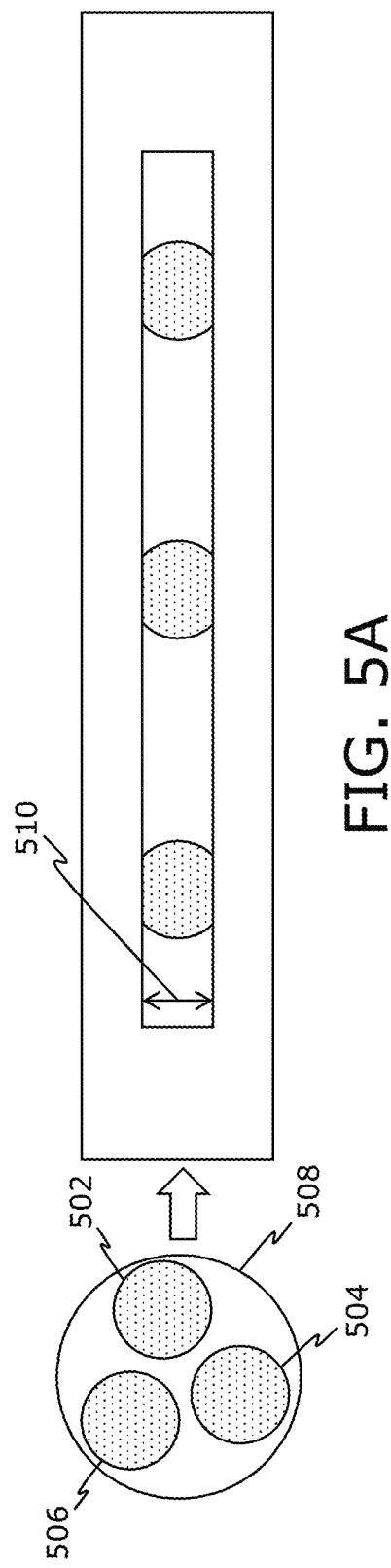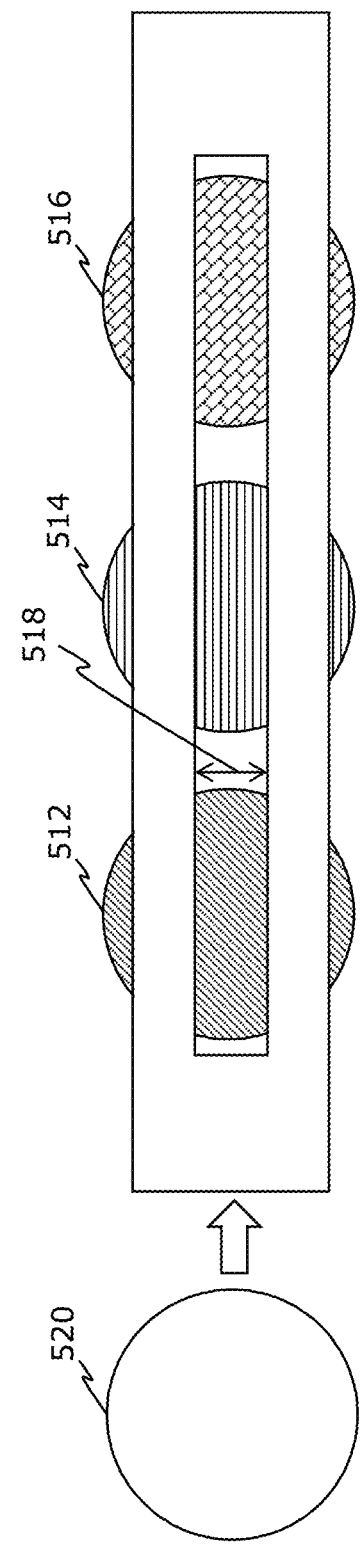

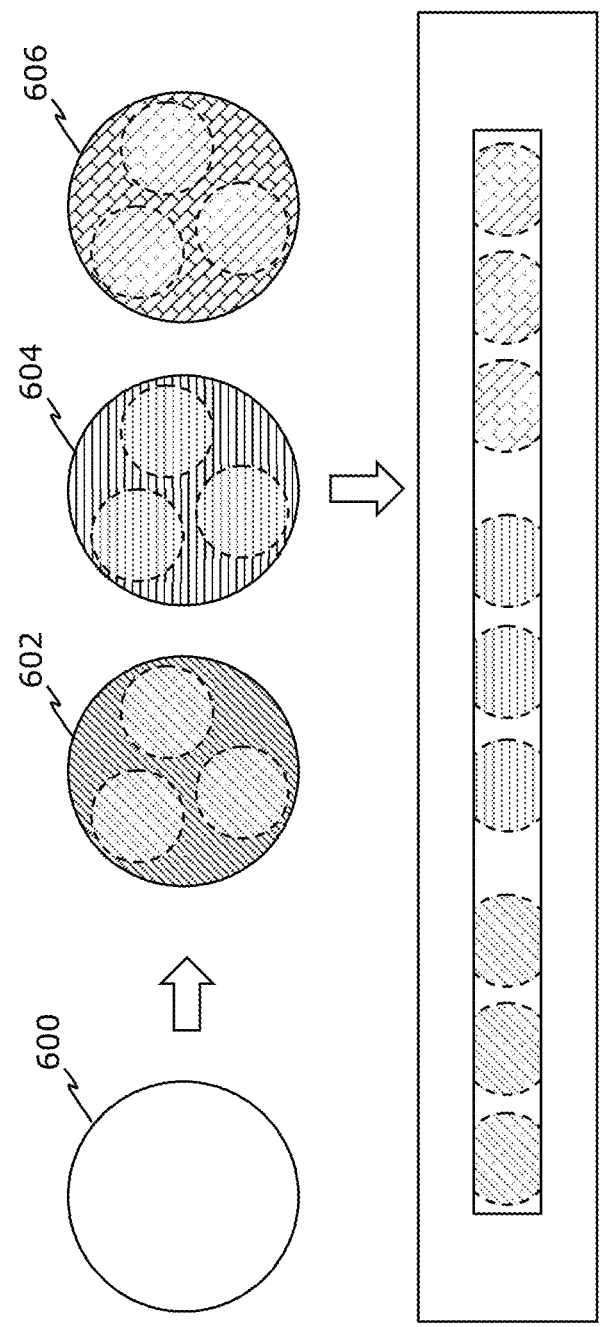

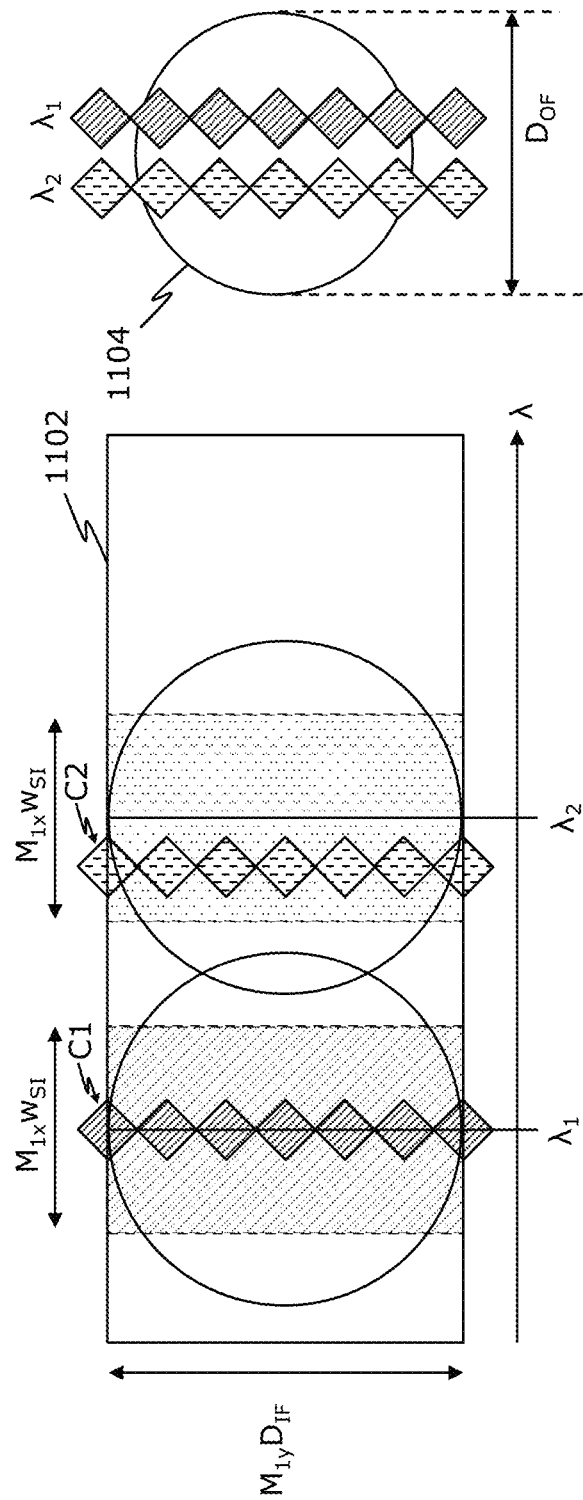

APPARATUS AND METHOD FOR MEASURING SPECTRAL COMPONENTS OF RAMAN SCATTERED LIGHT

TECHNICAL FIELD

The present disclosure relates to apparatuses for measuring spectral components of Raman-scattered light emitted by targets. Moreover, the present disclosure relates to methods for measuring spectral components of Raman-scattered light emitted by targets.

BACKGROUND

Over the past few decades, Raman spectroscopy has gained popularity as a widely used spectroscopic method to characterize and identify a target material, or to distinguish the target material from other materials. Raman spectroscopy is widely used in various fields, for example, art and archaeology, chemistry (both for organic and inorganic materials), geology, life sciences, pharmaceutics, semiconductors, and the like. Typically, the Raman spectroscopy is based upon interaction of light with chemical bonds within the target material. Upon said interaction, a Raman spectrum is generated which provides a distinct chemical fingerprint (comprising information pertaining to chemical structure, phase, polymorphism, crystallinity, molecular interactions, and the like) for molecules of the target material. Typically, the Raman spectroscopy is feasible with a range of diverse techniques involving optical components, such as, an optical spectrometer.

However, existing techniques for the Raman spectroscopy are associated with several limitations. Firstly, the existing techniques are associated with undesirable pulse front tilts, when single photon avalanche diode (SPAD) array detectors are employed in the optical spectrometer that uses angular dispersion. The greater the angular dispersion, the greater is the tilting of pulse front of light pulses. This broadens temporal response function of the optical spectrometer, leading to a poor time resolution. Moreover, the SPAD array detectors that are optimized for near-infrared (NIR) wavelengths are expensive to design and manufacture, thus are not available off-the-shelf. Secondly, a spatial light modulator (SLM) based spectrometer having one spectrograph and the SPAD array detectors is highly sub-optimal in nature. This is due to the fact that in such spectrometer, different wavelengths cannot be focused accurately to a same point. Thirdly, existing SLM based spectrometers having two spectrographs typically have a single channel for light propagation, and are not well suited to obtain an optimal combination of wavelength resolution, a spectral range and a large throughput. Moreover, such spectrometers are also inefficient in terms of stray light reduction, and maximizing dynamic range of single pulse (namely, a maximum number of the SPAD counts per single laser pulse). Further, the existing techniques and equipment for Raman spectroscopy are not well suited for detecting weak Raman signals combined with a strong and a short-lived photoluminescence. This leads to inaccuracies in measuring spectral components of such Raman signals.

Therefore, in light of the foregoing discussion, there exists a need to overcome the aforementioned drawbacks associated with the existing equipment and techniques for Raman spectroscopy.

SUMMARY

The present disclosure seeks to provide an apparatus for measuring spectral components of Raman-scattered light emitted by a target. The present disclosure also seeks to provide a method for measuring spectral components of Raman-scattered light emitted by a target. An aim of the present disclosure is to provide a solution that overcomes at least partially the problems encountered in prior art.

In one aspect, an embodiment of the present disclosure provides an apparatus for measuring spectral components of Raman-scattered light emitted by a target, the apparatus comprising:
a pulsed laser light source that is employed to emit a laser light beam;
probe optics comprising:
  excitation optics employed to direct the laser light beam towards the target; and
  collection optics employed to collect the light beam scattered and emitted by the target;
an optical spectrometer comprising:
  an input divider employed to divide the collected light beam, received from the collection optics, into at least a first light beam and a second light beam;
  a first spectrograph comprising at least a first input aperture and a second input aperture for receiving the first light beam and the second light beam, respectively, and an optical disperser employed to disperse the first light beam and the second light beam angularly;
  a second spectrograph comprising at least a first input aperture and a second input aperture, and at least a first output aperture and a second output aperture; and
  a spatial light modulator comprising a two-dimensional array of pixels arranged to receive, from the optical disperser of the first spectrograph, the dispersed first light beam on a first modulation area and the dispersed second light beam on a second modulation area and to selectively provide at least a part of at least one of the dispersed first light beam and the dispersed second light beam to a corresponding input aperture of the second spectrograph, wherein the second spectrograph is employed to reverse the dispersion of a given light beam and focus the given light beam to a corresponding output aperture; and
a time-resolved detector element employed to measure the spectral components of the given light beam emanating from the corresponding output aperture,
wherein the optical spectrometer further comprises at least one delay line that is employed to delay at least a part of at least one of the first light beam or the second light beam, the at least one delay line being arranged on at least one of:
  an optical path between the input divider and the first spectrograph,
  an optical path between the second spectrograph and the time-resolved detector element.

In another aspect, an embodiment of the present disclosure provides a method for measuring spectral components of Raman-scattered light emitted by a target, the method comprising:
emitting a laser light beam from a pulsed laser light source;
directing the laser light beam towards the target using excitation optics;
collecting the light beam scattered and emitted by the target using collection optics;
receiving the collected light beam from the collection optics and dividing the collected light beam into at least a first light beam and a second light beam using an input divider;
dispersing the first light beam and the second light beam angularly using a first spectrograph;

receiving the dispersed first light beam and the dispersed second light beam on a first modulation area and a second modulation area of a spatial light modulator, respectively;

providing selectively at least a part of at least one of the dispersed first light beam and the dispersed second light beam to a second spectrograph;

reversing the dispersion of a given light beam using the second spectrograph; and measuring the spectral components of the given light beam emanating from the second spectrograph using a time-resolved detector element, wherein the method further comprises delaying at least a part of at least one of the first light beam or the second light beam using at least one delay line wherein the at least one delay line is arranged on at least one of:

an optical path between the input divider and the first spectrograph, an optical path between the second spectrograph and the time-resolved detector element.

Embodiments of the present disclosure substantially eliminate or at least partially address the aforementioned problems in the prior art, and enable the apparatus to provide an improved wavelength resolution, improved spectral range and throughput, improved time resolution of temporal apparatus response function, minimization of stray light, cancellation of pulse front tilts, and maximization of dynamic range of single laser pulse.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 5A illustrates an etendue-splitting input divider, while FIG. 5B illustrates a spectrally-splitting input divider, in accordance with an embodiment of the present disclosure;

FIG. 6 illustrates an exemplary combination of a spectrally-splitting input divider and an etendue-splitting input divider, in accordance with an embodiment of the present disclosure;

FIG. 11A illustrates an exemplary diagonal spectral orientation in a digital micromirror device, while FIG. 11B illustrates exemplary mirror columns on output optical fiber, in accordance with an embodiment of the present disclosure;

Figure 1:
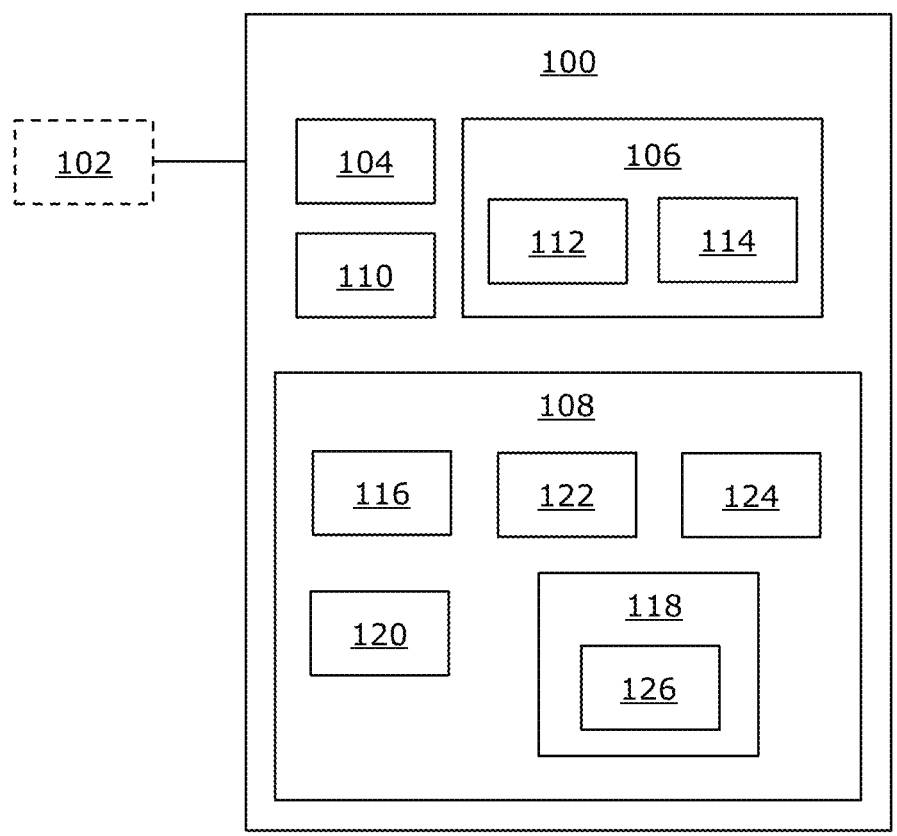
FIGS. 1 and 2 illustrate block diagrams of architectures of an apparatus for measuring spectral components of Raman-scattered light emitted by a target, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an apparatus for measuring spectral components of Raman-scattered light emitted by a target, the apparatus comprising:

a pulsed laser light source that is employed to emit a laser light beam;

probe optics comprising:
excitation optics employed to direct the laser light beam towards the target; and
collection optics employed to collect the light beam scattered and emitted by the target;

an optical spectrometer comprising:
an input divider employed to divide the collected light beam, received from the collection optics, into at least a first light beam and a second light beam;
a first spectrograph comprising at least a first input aperture and a second input aperture for receiving the first light beam and the second light beam, respectively, and an optical disperser employed to disperse the first light beam and the second light beam angularly;

a second spectrograph comprising at least a first input aperture and a second input aperture, and at least a first output aperture and a second output aperture; and a spatial light modulator comprising a two-dimensional array of pixels arranged to receive, from the optical disperser of the first spectrograph, the dispersed first light beam on a first modulation area and the dispersed second light beam on a second modulation area and to selectively provide at least a part of at least one of the dispersed first light beam and the dispersed second light beam to a corresponding input aperture of the second spectrograph, wherein the second spectrograph is employed to reverse the dispersion of a given light beam and focus the given light beam to a corresponding output aperture; and a time-resolved detector element employed to measure the spectral components of the given light beam emanating from the corresponding output aperture, wherein the optical spectrometer further comprises at least one delay line that is employed to delay at least a part of at least one of the first light beam or the second light beam, the at least one delay line being arranged on at least one of:
an optical path between the input divider and the first spectrograph,
an optical path between the second spectrograph and the time-resolved detector element.

In another aspect, an embodiment of the present disclosure provides a method for measuring spectral components of Raman-scattered light emitted by a target, the method comprising:

emitting a laser light beam from a pulsed laser light source;
directing the laser light beam towards the target using excitation optics;
collecting the light beam scattered and emitted by the target using collection optics;
receiving the collected light beam from the collection optics and dividing the collected light beam into at least a first light beam and a second light beam using an input divider;
dispersing the first light beam and the second light beam angularly using a first spectrograph;
receiving the dispersed first light beam and the dispersed second light beam on a first modulation area and a second modulation area of a spatial light modulator, respectively;
providing selectively at least a part of at least one of the dispersed first light beam and the dispersed second light beam to a second spectrograph;
reversing the dispersion of a given light beam using the second spectrograph; and
measuring the spectral components of the given light beam emanating from the second spectrograph using a time-resolved detector element,
wherein the method further comprises delaying at least a part of at least one of the first light beam or the second light beam using at least one delay line wherein the at least one delay line is arranged on at least one of:
an optical path between the input divider and the first spectrograph,
an optical path between the second spectrograph and the time-resolved detector element.

The present disclosure provides the aforementioned apparatus and the aforementioned method for measuring spectral components of Raman-scattered light emitted by a target. In the apparatus, a time-resolved optical spectrometer based on a spatial light modulator (SLM) and a detector element (such as a commercially available one-pixel single photon avalanche diode (SPAD)) is employed, the detector element is configured to be used as a time-resolved detector element. Indeed the time-resolved detector element refers to a detector, which can be turned active or inactive in time based matter. In one example the time-resolved detector element is turned on (i.e. to detect photons) for a period of time. Start-time of the period time is set to be in synchronization (start time is typically a few nanoseconds later, depending on the setup) with time of emitting a pulse of light. This way the time-resolved detector element can be configured to measure for a certain time period of scattered and emitted light from the target. Said spectrometer has two or more input apertures and same number of output apertures. The optical spectrometer facilitates selective measurement of spectral components of spectrum of the Raman-scattered light in a sequential manner. This is done by using different optical delays in the apertures and by dividing the light beam into an optimal number of channels (multiple channels) within the optical spectrometer. Moreover, in the apparatus, two spectrographs are used in subtractive dispersion configuration that effectively cancels total pulse front tilt. The second spectrograph reverses angular dispersion and pulse front tilt produced by the first spectrograph. Beneficially, the pulse front tilt cancellation leads to improvement in time resolution of the apparatus. The apparatus is well suited to obtain an optimal combination of wavelength resolution, a spectral range and a large throughput. This is attributed to the fact that the apparatus employs multi-channel spectrometers where each channel is associated with different optical pathlength. This also provides efficiency in terms of maximum stray light reduction, maximizing dynamic range of single pulse, and efficient detection of weak Raman-scattered light combined with a strong and short-lived photoluminescence. As a result, the spectral components of the Raman-scattered light are measured conveniently and with high accuracy. The apparatus enables measurements in the laboratory and industrial settings that were previously impossible.

Throughout the present disclosure, the term "spectral component" refers to component of spectrum of the Raman-scattered light that is emitted by the target. A spectral component consists of one or more wavelength bands having limited widths. Measuring a spectral component of Raman-scattered light means effectively detecting photons belonging only to the one or more wavelength bands comprising the spectral component.

Throughout the present disclosure, the term "target" refers to a specimen (namely, an analyte) to be studied and/or to be identified, based on the measured spectral components. It will be appreciated that the target may be in a solid state (such as, a powder), a liquid state (such as, a gel or a slurry), a gaseous state, and the like. Notably, different spectra of the Raman-scattered light are produced for different targets, based on molecular composition or structure of the target. This enables the study and/or identification of the target by measuring the spectral components of the Raman-scattered light emitted by the target.

Throughout the present disclosure, the term "pulsed laser light source" refers to a laser light source which emits a laser light beam in form of optical pulses (namely, in a non-continuous mode). It will be appreciated that the pulsed laser light source is employed to emit the laser light beam having a wavelength that lies in a visible range, a near-infrared (NIR) range, or a near-ultraviolet range. In an example, a center wavelength of the laser light beam emitted by the pulsed laser light source may be 532 nanometers, or 775 nanometers, or 1064 nanometers, and the like. Optionally, a pulse width (namely, full width at half maximum (FWHM)) of the pulsed laser light source lies in a range of 5 picoseconds to 200 picoseconds. For example, a given pulse width may be from 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190 or 195 picoseconds to 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195 or 200 picoseconds.

Throughout the present disclosure, the term "probe optics" refers to an optical arrangement for directing the laser light beam towards the target and for collecting the light beam scattered and emitted by the target.

Optionally, the excitation optics comprises at least one first optical element for coupling the laser light beam to the target. Notably, the excitation optics is employed to direct the laser light beam of a required wavelength towards the target. Operational specifications and/or arrangement of the at least one first optical element is selected based on the required wavelength and/or an arrangement of components within the apparatus.

Optionally, the excitation optics comprise a bandpass filter employed to spectrally clean up the emitted laser light beam before directing the laser light beam towards the target. Optionally, in this regard, the bandpass filter is configured to allow only the desired wavelength of the emitted laser light beam to be directed towards the target, and attenuate undesired wavelength(s) of the emitted laser light beam before reaching the target. In an example, the emitted laser light beam may have wavelengths that lie in a range of 750 nanometers to 760 nanometers. A required wavelength of the emitted laser light beam may be 755 nanometers. In such a case, the bandpass filter is employed to spectrally clean up the emitted laser light beam to attenuate all wavelengths of the emitted laser light beam other than that which is equal to 755 nanometers.

Optionally, the collection optics comprises at least one second optical element for coupling the light beam scattered and emitted by the target to the optical spectrometer. Operational specifications and/or arrangement of the at least one second optical element is selected as per requirement.

Optionally, the collection optics comprise at least one filter employed to reduce an amount of elastically scattered light present in the light beam scattered and emitted by the target. Notably, the light beam scattered and emitted by the target comprises both elastically scattered light and inelastically scattered light. The inelastically scattered light is referred to as "Raman-scattered light". It is well known that the amount of the elastically scattered light is much greater than the amount of the inelastically scattered light. As the apparatus measures the spectral components of the Raman-scattered light, the elastically scattered light is unwanted. The unwanted elastically scattered light is likely to interfere with the spectrum of the Raman-scattered light. Therefore, the elastically scattered light present in the light beam is reduced (namely, suppressed) in the collection optics, by means of the at least one filter, in order to prevent the elastically scattered light from reaching the optical spectrometer. Optionally, the at least one filter is employed to either partially or fully reduce the amount of the elastically scattered light present in the light beam scattered and emitted by the target. Optionally, the at least one optical filter is at least one of: a low-pass filter, a high-pass filter, or a notch filter.

Optionally, the excitation optics and/or the collection optics comprise optical fibers. When employed in the excitation optics, the optical fibers guide the laser light beam towards the target with minimal loss and electromagnetic interference. When employed in the collection optics, the optical fibers collect at least the Raman-scattered light emitted by the target. It will be appreciated that employing the optical fibers in the excitation optics and/or the collection optics facilitates flexibility in terms of using the apparatus. Types of the optical fibers may include, but are not limited to, multi-mode optical fibers, single-mode optical fibers, step index optical fibers, gradient index optical fibers, and microstructured optical fibers. Materials of the optical fibers may be plastic, glass, and the like.

Throughout the present disclosure, the term "optical spectrometer" refers to an instrument used to separate the collected light beam and measure properties of the collected light beam over a specific portion of electromagnetic spectrum. The optical spectrometer enables spectroscopic analysis of the target.

Throughout the present disclosure, the term "input divider" refers to an optical element that is employed to divide (namely, split) the collected light beam into a plurality of light beams (such as the first light beam and the second light beam). Optionally, the input divider comprises an input aperture for receiving the collected light beam, and a plurality of output apertures that are equal in number to input apertures of the first spectrograph for sending the first light beam and the second light beam to the first spectrograph. It will be appreciated that the collected light beam may also be divided, by the input divider, into additional light beams such as a third light beam, a fourth light beam, a fifth light beam, and so on.

Optionally, the first light beam and the second light beam comprise at least a portion of a range of wavelengths present in the Raman-scattered light emitted by the target. When a given light beam comprises at least a portion of a range of wavelengths present in the Raman-scattered light, it means that the given light beam comprises a specific range of wavelengths from amongst an entirety of the range of wavelengths present in the Raman-scattered light, or an entirety of the range of wavelengths present in the Raman-scattered light. The first light beam and the second light beam may comprise same or different portions of the range of wavelengths present in the Raman-scattered light. Moreover, the first light beam and the second light beam may comprise equal or unequal portions of the range of wavelengths present in the Raman-scattered light, wherein a range of wavelengths present in a given portion depend on a type and configuration of the input divider.

In an example, a range of 775 nanometers to 1045 nanometers wavelengths may be present in the Raman-scattered light. In one case, the first light beam may comprise wavelengths lying in a range of 775 nanometers to 871 nanometers, while the second light beam may comprise wavelengths lying in a range of 871 nanometers to 967 nanometers and the third light beam may comprise wavelengths lying in a range of 967 nanometers to 1045 nanometers. In another case, the first light beam and the second light beam may both comprise wavelengths lying in the range of 775 nanometers to 1045 nanometers. In yet another case, the first light beam may comprise wavelengths lying in a range of 775 nanometers to 967 nanometers, while the second light beam may comprise wavelengths lying in a range of 967 nanometers to 1045 nanometers. In still another case, the first light beam and the second light beam may both comprise wavelengths lying in the range of 775 nanometers to 967 nanometers.

Optionally, the input divider comprises a fiber bundle and/or an arrangement of dichroic filters. The term "fiber bundle" refers to an optical fiber assembly comprising at least two optical fibers in a single cable. The fiber bundle is employed to convert the collected light beam (namely, a circular input light beam) into an array of beams of smaller diameter than that of the collected light beam. Each beam in the array of beams corresponds to an optical fiber in the fiber bundle. In an example, the fiber bundle comprises four optical fibers. In another example, the fiber bundle comprises eight optical fibers. The dichroic filter is a specialized filter wherein a specific wavelength or a range of wavelengths of the light is transmitted, while other wavelengths of the lights are reflected. Optionally, the input divider further comprises an arrangement of lenses and/or mirrors.

Optionally, the input divider is an etendue-splitting input divider. Such input divider comprises either the fiber bundle or any other type of etendue-splitting waveguide. In an example implementation, the tip of a round input fiber may be physically connected to the tip of the fiber bundle comprising a plurality of round fibers having smaller diameter than the round input fiber. It will be appreciated that the etendue-splitting input divider facilitates achieving considerable spectral resolution without sacrificing too much of input (which is the collected light beam). Moreover, the fiber bundle of the etendue-splitting input divider is simple in construction and cost-effective as compared to that of an arrangement of dichroic filters. However, the etendue-splitting input divider is prone to incurring some spectral loss due to insertion (of the collected light beam) based on geometry of splitting the collected light beam. This is due to geometric overlapping between ends of the round fibers. In addition to this, loss occurs upon division of the collected light beam into multiple spectral bands in the optical spectrometer. In such a case, input spectral power (minus spectral loss due to insertion) is equally divided between input apertures of the first spectrograph. In that case, generated spectra are shifted relative to each other in plane of the spatial light modulator (SLM). Herein, some parts of the generated spectra are utilized by the SLM, and rest of the parts are lost. For example, there may be three input apertures in the first spectrograph, and thus three spectra are shifted relative to each other in the plane of the SLM. Herein, three equal parts of the generated spectra out of total nine parts are utilized by the SLM, and six parts are lost. In such a case, the division loss at the SLM is equal to 6/9 (or 2/3).

Alternatively, optionally, the input divider is a spectrally splitting input divider. Such input divider comprises at least one dichroic filter. The spectrally splitting input divider conserves input etendue of the collected light beam in all the input apertures of the first spectrograph, and multiplies the input etendue by number of the input apertures. It will be appreciated that no geometric spectral loss occurs in the spectrally splitting input divider. However, the spectrally splitting input divider is prone to loss in spectral resolution. When round input fibers are not tapered, the input etendue of the collected light beam is same for both the etendue-splitting input divider and the spectrally splitting input divider. In each of the etendue-splitting input divider and the spectrally splitting input divider, part of the input etendue of the collected light beam is lost. Particularly, the etendue-splitting input divider loses most part of the input etendue at the fiber bundle, and the spectrally splitting input divider loses most part of the input etendue at input slit of the first spectrograph.

In order to compensate for the aforementioned limitations associated with the etendue-splitting input divider and the spectrally splitting input divider, a combination of the etendue-splitting input divider and spectrally splitting input divider is optionally employed as the input divider of the present disclosure.

The number of input apertures of the first spectrograph is equal to the number of output apertures of the input divider. The given light beam to be dispersed enters the first spectrometer via a given input aperture. The number of input apertures of the first spectrograph define (and is equal to) the number of channels in the optical spectrometer. Each channel of the first spectrograph contains a separate light beam. Each channel is configured to comprise either all wavelengths of the given light beam or only a limited portion of the wavelengths thereof. The range of wavelengths of the given light beam present in each channel depends on the type of the input divider (such as, the etendue-splitting input divider and the spectrally splitting input divider) and the configuration of the input divider. Optionally, the given light beam enters the first spectrograph by either utilizing a fiber optics or a free-space beam optics. All channels of the first spectrograph employ similar optics, but light beams associated to different channels occupy different spatial extents and/or angular extents.

The term "spectrograph" refers to an optical device used to obtain and record the spectrum produced by the Raman-scattered light, in order to facilitate measurement of the spectral components of the Raman-scattered light. The term "optical disperser" refers to an optical element (in the first spectrograph) used to disperse (namely, separate) the given light beam into its constituent spectral components. When the given light beam passes through the optical disperser, the optical disperser disperses the given light beam into its constituent wavelengths or wavelength bands. Examples of the optical disperser include, but are not limited to, a dispersive prism, a diffraction grating, a Fabry-Pérot etalon. The change of angle divided by change of wavelength of the beam exiting the disperser is called angular dispersion. Different wavelengths or wavelength bands of the given light beam will be deviated by the optical disperser at different angles, thus producing a spectrum per given light beam. In other words, for each channel of the first spectrograph, the optical disperser spectrally disperses the given light beam to generate the spectrum in a separate position on the spatial light modulator. In a first example, the optical disperser of the first spectrograph angularly disperses the first light beam into a continuum of wavelength bands including $\lambda_1$, $\lambda_2$, and $\lambda_3$ bands.

Throughout the present disclosure, the term "spatial light modulator" refers to an electronically programmable (namely, addressable) device used to modulate, in a spatially varying manner, intensity and/or phase of light incident thereupon. Optionally, the SLM is a reflective type SLM. The reflective type SLM is, for example, implemented as a digital micro-mirror device (DMD). Notably, there are several significantly different practical orientations of spectra and tilt angle associated with the DMD. Further, there can be many different ways in which micromirrors in the DMD are tilted, for example, in on-state tilt direction and in off-state tilt direction. Alternatively, optionally, the SLM is a transmissive type SLM. The transmissive type SLM is, for example, implemented as a liquid crystal display (LCD). In some implementations, use of the reflective type SLM is preferred over the transmissive type SLM.

Notably, the SLM is located in between the first spectrograph (specifically, at the output of the first spectrograph) and the second spectrograph (specifically, at input of the second spectrograph). The SLM and the first spectrograph are configured to focus the generated spectrum corresponding to each input aperture of the first spectrograph on separate non-overlapping modulation areas of the SLM. In particular, the SLM receives different dispersed light beams on different modulation areas of its two-dimensional array of pixels. Optionally, an arrangement of the SLM with respect to the optical disperser of the first spectrograph enables in receiving dispersed first and second light beams on separate modulation areas. Referring to the first example, the wavelength bands $\lambda_1$, $\lambda_2$, and $\lambda_3$ of the dispersed first light beam may be received on the first modulation area of the SLM. The first modulation area is different from the second modulation area.

Optionally, a given modulation area of the spatial light modulator comprises at least two pixels, and wherein a given pixel is employed to either block or transmit a given light beam to a corresponding input aperture of the second spectrograph, further wherein the apparatus comprises a controller configured to control the at least two pixels of the given modulation area of the spatial light modulator. Typically, the given modulation area of the SLM comprises several thousand pixels. It is to be understood that the given pixel is ON when the given light beam impinging on it is transmitted to the corresponding input aperture of the second spectrograph, and the given pixel is OFF when the given light beam impinging on it is not transmitted to the corresponding input aperture of the second spectrograph. Spectral components of light beams that are not directed into any input aperture of the second spectrograph are not measured. Referring to the first example, the SLM may be configured to transmit light beam having wavelength band $\lambda_1$ and block the other light beams having wavelength bands $\lambda_2$ and $\lambda_3$. The second spectrograph thus redirects the light beam having wavelength band $\lambda_1$ to output aperture of the second spectrograph, and eventually to the detector element which is configured to detect in a time-resolved manner.

Optionally, when the given pixel is employed to block the given light beam, the SLM is configured to transmit the blocked light beam to a beam dump. The term "beam dump" refers to a device designed to absorb energy of photons in the blocked light beam, and may also be referred to as a beam block, a beam stop, or a beam trap.

The term "controller" refers to hardware, software, firmware or a combination of these. Optionally, the controller is communicably coupled to the SLM to control the at least two pixels of the given modulation area of the SLM. In particular, the controller is configured to control all pixels of the two-dimensional array of pixels of the SLM. Examples of the controller may include, but are not limited to, a field programmable gate arrays (FPGA), a microcontroller, a microprocessor, a central processing unit (CPU).

By "selectively provide at least a part of at least one of the dispersed first light beam and the dispersed second light beam to a corresponding input aperture of the second spectrograph", it is meant that:

a part or an entirety of the dispersed first light beam is provided to the first input aperture of the second spectrograph, while the dispersed second light beam is not provided to the second input aperture of the second spectrograph;

a part or an entirety of the dispersed second light beam is provided to the second input aperture of the second spectrograph, while the dispersed first light beam is not provided to the first input aperture of the second spectrograph; or a part or an entirety of the dispersed first light beam is provided to the first input aperture of the second spectrograph, while a part or an entirety of the dispersed second light beam is provided to the second input aperture of the second spectrograph.

In an example, there may be a spatial light modulator comprising a two-dimensional array of 2000 pixels, wherein a first modulation area may comprise 1000 pixels and a second modulation area may comprise 1000 pixels. In one case, the entirety of the dispersed first light beam is provided to the first input aperture of the second spectrograph, while the dispersed second light beam is not provided to the second input aperture of the second spectrograph. In that case, 1000 pixels of the first modulation area are ON, and 1000 pixels of the second modulation area are OFF. In another case, half of the dispersed second light beam is provided to the second input aperture of the second spectrograph, while the dispersed first light beam is not provided to the first input aperture of the second spectrograph. In that case, 500 pixels of the second modulation area are ON, 500 pixels of the second modulation area are OFF, and 1000 pixels of the first modulation area are OFF. In yet another case, half of the dispersed first light beam is provided to the first input aperture of the second spectrograph, while the entirety of the dispersed second light beam is provided to the second input aperture of the second spectrograph. In that case, 500 pixels of the first modulation area are ON, 500 pixels of the first modulation area are OFF, and 1000 pixels of the second modulation area are ON.

Optionally, at any time instant, at least one spectral band is selected to be measured by the optical spectrometer, by switching on at least one pixel of the given modulation area of the SLM that receives the dispersed given light beam belonging to said spectral band. In other words, selective provision of at least the part of at least one of the dispersed first light beam and the dispersed second light beam can be performed dynamically, as required. In some implementations, the SLM is configured to transmit, to the second spectrograph, only one light beam from amongst a plurality of dispersed light beams incident thereupon, whilst blocking other dispersed light beam(s). In other implementations, the SLM is configured to transmit, to the second spectrograph, two or more light beams from amongst a plurality of dispersed light beams incident thereupon, whilst blocking other dispersed light beam(s).

The second spectrograph is employed to collect a given dispersed light beam from the given modulation area of the SLM, and to reverse angular dispersion of the given dispersed light beam. It will be appreciated that using optics of the second spectrograph in reversing the angular dispersion facilitates in pulse front tilt cancellation that is produced by the angular dispersion. An arrangement and/or a configuration of these optics enables reversing the angular dispersion. These optics are implemented by way of one or more optical elements such as optical dispersers, mirrors, prisms, lenses, and similar.

Optionally, when the given pixel is employed to block (namely, when the given pixel is OFF) the given light beam to the corresponding input aperture of the second spectrograph, the dispersion of the given light beam is not reversed as the given light beam does not reach the optics of the second spectrograph, and the given light beam is not focused to the corresponding output aperture of the second spectrograph. In such a case, the spectral components of the given light beam are not measured. Alternatively, optionally, when the given pixel is employed to transmit (namely, when the given pixel is ON) the given light beam to the corresponding input aperture of the second spectrograph, the dispersion of the given light beam is reversed as the given light beam interacts with the optics of the second spectrograph, and the given light beam is focused to the corresponding output aperture of the second spectrograph. In such a case, the spectral components of the given light beam are measured.

Notably, angular dispersion implemented by the optical disperser is associated with a proportional pulse front tilt, which is undesirable. When the first spectrograph and the second spectrograph are beneficially implemented in the aforesaid subtractive dispersion configuration, the second spectrograph effectively cancels the pulse front tilt. As a result, time resolution of temporal apparatus response function is narrowed (and is therefore, improved).

The optical spectrometer facilitates selectively measuring the spectral components of the given light beam as per requirement. It will also be appreciated that the SLM, in combination with the first spectrograph and the second spectrograph, acts as a fast and flexible filter in the optical spectrometer. This can be attributed to the fact that the pixels of the SLM are employed to either block or transmit at least a part of the given light beam independently. This can be considered an optical filtering operation performed by the SLM. In such a case, a complete Raman spectra could be acquired by scanning one wavelength band at a time, or arbitrary combinations of such bands could be easily allowed to pass to the detector or be blocked, as required. The SLM can be thought of as a generalization of a conventional double monochromator. Beneficially, such an SLM compensates for excess pulse front tilts caused by the angular dispersion.

Overall spectral resolution of the optical spectrometer is determined by an optical spectral resolution of the first spectrograph and a sampling resolution of the SLM.

The time-resolved detector element is arranged at the output apertures of the second spectrograph. The time-resolved detector element, in operation, detects the light beam(s) emanating from (namely, exiting) the output apertures of the second spectrograph. The time-resolved detector element converts the given light beam into a proportional electrical signal in order to measure the spectral components of the given light beam.

Optionally, the time-resolved detector element comprises a single photon avalanche diode. The term "single photon avalanche diode" refers to a solid-state photodetector able to detect intensity of the given light beam down to a single photon-levels in the given light beam. The single photon avalanche diode (SPAD) is able to detect every single photon in the given light beam that emanates from the corresponding output aperture of the second spectrograph. Moreover, the SPAD can also be used to obtain time of arrival of each photon.

Alternatively, optionally, the time-resolved detector element is implemented using an array of single photon avalanche diodes. In this case, a plurality of SPADs are employed as a detector element for the time-resolved detector element.

Optionally, the controller is communicably coupled to the detector. Optionally, in this regard, the controller is configured to communicate, to the detector element, information pertaining to transmittance and/or blocking of a part or an entirety of a given light beam. This optionally facilitates to synchronize operation of the detector element with the SLM, as the detector element would already be informed about the light beam(s) that it is supposed to detect and analyze. Indeed combination of controller and a detector element forms a time-resolved detector element.

Operation of the time-resolved detector element for measuring the spectral components of the Raman-scattered light is described later in more detail.

Optionally, the second spectrograph is the first spectrograph. Optionally, in this regard, the apparatus comprises a single spectrograph that performs functions of both the first spectrograph and the second spectrograph. In such a case, a construction of the single spectrograph is such that in addition to optics of the first spectrograph, there would also be present an arrangement of optical elements (for example, such as an arrangement of mirror(s), lens(es), and the like) on an optical path of the given light beam, that reverses the dispersion of the given light beam and cancels the pulse front tilt produced by the optics of the first spectrograph.

Optionally, the apparatus further comprises an output combiner employed to combine the first light beam and the second light beam focused from the first output aperture and the second output aperture of the second spectrograph, respectively. Optionally, in this regard, the detector element receives a combined light beam including both the first light beam and the second light beam, from the output combiner. The output combiner reverses the effect of the input divider. Since spectral resolving is done by input slit image at the SLM (for example, implemented as the DMD), adding separate output apertures to the second spectrographs is optional.

Throughout the present disclosure, the term "delay line" refers to at least one optical fiber that is used to delay at least a part of a given light beam, depending upon an arrangement of the at least one delay line in the apparatus. Optionally, the at least one delay line has a length of several meters. The at least one delay line introduces a relative time delay between light beams traveling through various channels of the optical spectrometer. It will be appreciated that an amount of delay between successive channels is equal to useful hold-off time of the detector element (for example, a single SPAD). Even in case of employing multiple SPADs, a nanosecond-range delay between successive channels is intentionally added by employing the at least one delay line. In such a case, Raman signal of each channel only has a stray light contribution from itself and not from other channels. Therefore, the at least one delay line enables in minimizing stray light within the apparatus.

Herein, the term "stray light" refers to undesired light. If the stray light undesirably reaches the detector element, it would prevent in accurately measuring the spectral components of the given light beam. In some cases, when the SLM is implemented as the DMD, the DMD inevitably causes the stray light, due to diffraction at mirror edges and due to scattering from and within mechanics under micromirrors of the DMD. Moreover, when the DMD causes the stray light due to the diffraction at the mirror edges, an area of on-state micromirrors acts as a two-dimensional blazed grating. Depending upon a ratio of a wavelength of light incident thereupon to micromirror step size, one or more diffraction orders above zero have non-negligible intensity. Also, an area of off-state micromirrors also form a two-dimensional lattice from which diffraction can occur.

Practically, a modulation contrast of the SLM may not ideal, and there may be stray light transmitted to the detector element at the unwanted wavelengths. Referring to the first example, the SLM is configured to transmit only the light beam having wavelength band $\lambda_1$ but there may be stray light pertaining to the blocked light beams having wavelengths in the wavelength bands $\lambda_2$ and $\lambda_3$ that exits the SLM and reaches the second spectrograph, and eventually to the detector element. The stray light corresponding to the wavelength bands $\lambda_2$ and $\lambda_3$ would have a non-negligible amplitude, and may thus interfere with measurement of the spectral components of the given light beam. In order to reduce such undesirable effects of the stray light, the at least one delay line is beneficially employed in the apparatus. Additionally, optionally, the apparatus further comprises at least one dichroic color filter in the optical path between the input divider and the first spectrograph. The at least one dichroic color filter also facilitates in minimizing the stray light in the apparatus, thereby, improving accuracy of measurement of the spectral components of the Raman-scattered light.

It will be appreciated that the at least one delay line that is arranged on the optical path between the input divider and the first spectrograph may be understood to be at least one "input delay line", whereas at least one delay line that is arranged on the optical path between the second spectrograph and the detector element may be understood to be at least one "output delay line". The apparatus comprises at least one input delay line and/or at least one output delay line.

By the phrase "delay at least a part of at least one of the first light beam or the second light beam", it is meant that:
the at least one delay line delays a part or an entirety of the first light beam, while not delaying the second light beam;
the at least one delay line delays a part or an entirety of the second light beam, while not delaying the first light beam; or
the at least one delay line delays a part or an entirety of the first light beam, while also delaying a part or an entirety of the second light beam, the delay corresponding to the first light beam being different from the delay corresponding to the second light beam.

In each of the above cases, there is introduced a relative time delay between at least a part of the first light beam and at least a part of the second light beam.

Optionally, the at least one delay line is arranged on the optical path between the input divider and the first spectrograph, wherein the at least one delay line comprises fixed optical fibers or fiber bundles employed to convey at least one of the first light beam and the second light beam from the input divider to the first input aperture and the second input aperture of the first spectrograph, respectively, with any one of:
a delay in at least part of at least one of the first light beam and the second light beam, or
different delays in at least part of the first light beam and the second light beam.

In such a case, there is introduced a relative time delay between the first light beam and the second light beam at an input side of the optical spectrometer. As a result, at least part of the first light beam and at least part of the second light beam enter the first spectrograph at different time instants, and travel through the first spectrograph, the SLM and the second spectrograph with the relative time delay.

In an embodiment, operation of the SLM is synchronized according to delay introduced by the at least one delay line. In other words, the first light beam and the second light propagate one behind another according to delays provided in their respective input delay line(s) to enter the first spectrograph. The SLM allows the first light beam and/or the second light beam to be transmitted into the second spectrograph at different time instants. When only one of the first light beam and the second light beam is transmitted at a given time instant, and the other beam is blocked, stray light pertaining to the blocked beam is inevitably transmitted to enter the second spectrograph according to the delay corresponding to the blocked beam. As a result, the transmitted light beam and the stray light are received at different time instants, at the detector element. It will be appreciated that since the detector element is time-resolving, the transmitted light beam would be considered for measurement, whereas the stray light pertaining to the blocked beam can be discarded and not considered for measurement. This enables in improving accuracy of measurement of the spectral components of the Raman-scattered light.

Optionally, the at least one delay line is arranged on the optical path between the second spectrograph and the detector element, wherein the at least one delay line comprises fixed optical fibers or fiber bundles employed to convey the first light beam and the second light beam from the first output aperture and the second output aperture of the second spectrograph, respectively, to the detector element with any one of:
a delay in at least part of at least one of the first light beam and the second light beam, or
different delays in at least part of the first light beam and the second light beam.

In such a case, there is introduced a relative time delay between the first light beam and the second light beam at an output side of the optical spectrometer. As a result, the first light beam and the second light beam are received at the time-resolved detector element at different time instants. In this case, the first light beam and the second light beam travel through the first spectrograph, the SLM and the second spectrograph without any relative time delay, but are incident at the time-resolved detector element at the different time instants. The time-resolved detector element is able to efficiently resolve light beams detected at the different time instants, thereby improving accuracy of measurement of the spectral components of the Raman-scattered light.

It will be appreciated that by employing the at least one delay line in the apparatus, an inter-pulse delay (namely, relative time delay between pulses) between the first light beam and the second light beam is provided. This inter-pulse delay must be long enough for allowing the detector element to re-activate itself after potentially detecting a photon in one of the first light beam or the second light beam. In other words, if the inter-pulse delay is shorter than dead time of the detector element (for example, the SPAD dead time) and the detector element is already triggered by a photon in the one of the first light beam or the second light beam, when the detector element is again triggered by any potential photons in the other of the first light beam or the second light beam, these photons are lost.

Typically, a minimum value of dead time of the SPAD is in order of tens of nanoseconds. This means that lengths of the at least one delay line must be at least several meters of the optical fiber to provide required delay of the given light beam. A length of a given delay line is directly related to the delay provided by the given delay line. In an example, the at least one delay line may be of X1 meters, X2 meters, and X3 meters with corresponding delays of Y1 nanoseconds, Y2 nanoseconds, and Y3 nanoseconds For example, when X1 is less than X2 which is less than X3, then Y1 is less than Y2 which is less than Y3. In another example, the at least one delay line may have a zero length. This means there would not be any delay associated with the at least one delay line. For example, in an embodiment, Y1 can be zero nanoseconds, Y2 can be from 10 nanoseconds up to 30 nanoseconds and Y3 can be from 40 nanoseconds up to 60 nanoseconds. Y2 can be from 10, 15, 20, 25 nanoseconds up to 20, 25, 30 nanoseconds and Y3 can be from 40, 45, 50, 55 nanoseconds up to 50, 55, 60 nanoseconds. The propagation time of a light pulse through one meter of a typical silica glass fiber is approximately from 3, 4, 5 nanoseconds up to 5, 6, 7 nanoseconds. Thus, in this example, X3 can be approximately from 10 meters up to 14 meters, X2 can be approximately from 4 meters up to 8 meters and X1 can be nominally zero meters. X3 can be approximately from 10, 11, 12 meters up to 12, 13, 14 meters, X2 can be approximately from 4, 5, 6 meters up to 6, 7, 8 meters Optionally, the fixed optical fibers or fiber bundles (that are used to implement the at least one delay line) comprise a plurality of optical fibers. It will be appreciated that the fiber bundle facilitates in merging a beam-reshaping function with a delay line effect. This is done by using different lengths of the fiber bundles with respect to each spectrometer channel. In a practical SLM based-optical spectrometer with delay lines such as the one described herein, the delayed light beams travel through the optical spectrometer one at a time. The temporal lengths of pulses within the given light beam are on the order of tens of picoseconds (however, photoluminescence tails of light beams can be arbitrarily long).

Optionally, the detector element employs time-gated detection for measuring the spectral components of the Raman-scattered light. Herein, the term "time gated detection" refers to a detection using time-gating technique to efficiently discriminate between a Raman signal (comprising the spectral components of the Raman-scattered light) and a (undesirable) noise signal (such as, a photoluminescence signal, a fluorescence signal, a stray light signal, and the like), for measurement of the spectral components of the Raman-scattered light. In the time-gating technique, a time record of light signals detected by the detector element are isolated in a manner that only those portions of the time record which include the Raman signal and potentially a simultaneously occurring noise signal are isolated for measurement purposes, and not those portions which include only the noise signal. It will be appreciated that the detector element is optionally employed in either gated operation mode or non-gated operation mode. Time-gated detection will now be described in more detail. When the detector is employed as gated operation mode it works as time-resolved detector.

Optionally, pixel switching time ($\Delta t_{PS}$) lies in a range of 6 microseconds to 20 microseconds. The micromirror pixel switching time is a significant factor when measurement situation demands a fast switching between signal bands (that include both the Raman signal and the noise signal) and baseline bands (that include only the noise signal). Below, a residual fluorescence model is employed for duty cycle and signal-to-noise ratio (SNR) calculations. In such a case, the baseline bands are considered to include only residual fluorescence.

Optionally, the duty cycle of a (single) measurement cycle is mathematically expressed as:

$$C_{MC} = \frac{\Delta t_{MC} - n_{PC}\Delta t_{PS}}{\Delta t_{MC}} = 1 - \frac{n_{PC}\Delta t_{PS}}{\Delta t_{MC}} \tag{1}$$

wherein $C_{MC}$ denotes the duty cycle of the measurement cycle or the duty cycle of one complete measurement, $\Delta t_{MC}$ denotes a duration of one measurement cycle, and $n_{PC}$ denotes a number of different SLM pixel configurations. The term "duty cycle" refers to a fraction of one period in which the optical signal pertaining to the measurement cycle or the complete measurement is active. The duty cycle may be expressed as a ratio of a (time) duration for which the optical signal is active to the duration of one measurement cycle (referred to as $\Delta t_{MC}$). The optical signal is inactive only during switching of the pixels of the SLM (as while switching, the pixels would not transmit the optical signal towards the detector element), and this duration is given as $n_{PC}\Delta t_{PS}$.

Optionally, a complete measurement comprises a plurality of cycle repeats (denoted as $n_{CR}$) of the (single) measurement cycle. The number baseline points ($n_{bl}$), which is a necessary factor in SNR estimation, is related to the number of pixel configurations in a cycle by the formula: $n_{PC}=n_{bl}+1$, and time spent in each SLM pixel configuration as same.

Optionally, a duty time spent in each of spectral bands during one measurement cycle is expressed as $$\frac{\Delta t_{MC}}{n_{PC}} - \Delta t_{PS}.$$

Therefore, a total time spent in each spectral band during the complete measurement cycle is calculated as $$n_{CR}\left(\frac{\Delta t_{MC}}{n_{PC}} - \Delta t_{PS}\right).$$

With laser repetition rate given as $f_{EX}$, a number of pulses per spectral band (denoted as N) is expressed as:

$$N = f_{EX}n_{CR}\left(\frac{\Delta t_{MC}}{n_{PC}} - \Delta t_{PS}\right) \tag{1}$$

Optionally, considering that only overhead in measurement comes from $\Delta t_{PS}$, a measurement duration is expressed as:

$$\Delta T = n_{CR}\Delta t_{MC} \tag{2}$$

Using the equations (1), (2), and (3), the number of pulses per spectral band can be expressed as:

$$N = \frac{f_{EX}C_{MC}\Delta T}{n_{PC}} \tag{3}$$

It will be appreciated that the equation (4) allows for computation of unit-time SNR estimates of different apparatuses.

In the time-gated detection, it is customary to measure a background signal using a separate gate delay setting which makes all time bins slightly precede the emission pulse's arrival to the detector. Such background consists of any background light including but not limited to sunlight, bioluminescence and thermal radiation that are not temporally correlated with the pulsed laser excitation of the sample. Optionally, the background signal is a residual fluorescence signal that is given by the residual fluorescence model. These measurements of the background signal are intermingled in each measurement cycle, and thus make the complete measurement cycle considerably long. It is considered in the present disclosure that separate background measurements are not made, but that the background signal is naturally available on account of employing, in the apparatus, a time-to-digital converter (TDC) having a long usable TDC range.

Optionally, the detector element is optimized, in time resolved mode, for at least one of:
maximizing a photon detection probability (PDP) within a certain wavelength range,
minimizing a timing jitter (namely, an approximate Gaussian part of a time response),
minimizing a diffusion tail length (namely, an exponential part of the time response),
minimizing a dark count rate (DCR) at a certain temperature,
optimizing its active area size depending upon rest of optics of the apparatus
a required gating speed (especially, a rise-time of gating),
a required after-pulsing probability (at envisioned detection rates),
a dead-time after an avalanche.

Optionally, in this regard, the detector element is implemented as the SPAD or Geiger-mode avalanche photodiodes.

Optionally, a SPAD module comprises electronics for at least one of: a bias voltage setting, thermoelectric cooling. It will be appreciated that the higher the bias setting of the bias voltage, the higher the PDP and DCR, and the smaller is the timing jitter.

Typically, when operating a complementary metal oxide semiconductor-SPAD (CMOS-SPAD) array, all SPADs are gated on and off simultaneously. As a result, when a hold-off time ($\Delta t_{HO}$) is longer than laser pulse repetition period, an effective repetition rate is decreased to $1/\Delta t_{HO}$. However, in the apparatus, the detector element is optionally a single SPAD. Certain modes of operation of the single SPAD are different from those of the CMOS-SPAD arrays. When operating a single SPAD (along with the TDC), a hold-off time ($\Delta t_{HO}$) could easily be longer than laser pulse repetition period without adversely impacting the effective repetition rate.

Optionally, in the gated operation mode, the detector element is photosensitive only during gate-on window. In such a case, during gate-off window, the detector element is disabled and absorbed photons do not trigger an avalanche. Optionally, when employing the pulsed laser source with low repetition rate, the gated operation mode is preferred for the detector element. This is due to the fact that in such a case, the gated operation mode provides efficient rejection of dark counts (thereby, minimizing the DCR) and rejection of background light (thereby, minimizing the background signal).

Optionally, the gated operation mode includes two qualitatively different gated modes, differentiated by the hold-off time $\Delta t_{HO}$ relative to the laser repetition period $T_L$. In one gated mode, the hold-off time is minimal, and all pulses that are received at the detector element could potentially contribute to the Raman signal. In such a case, there is no hold-off time in addition to quenching time ($\Delta t_Q$) as with $\Delta t_Q \ll T_L$ each pulse can be counted. In another gated mode, the hold-off time is considerably long, and there may be some lost Raman signal counts. In other words, there may be pulses which are not counted. In such a case, sum of gating time ($\Delta t_G$) and the hold-off time is approximately twice of the laser repetition period, i.e. $\Delta t_G + \Delta t_{HO} \approx 2T_L$ or longer.

The present disclosure also relates to the method as described above. Various embodiments and variants disclosed above, with respect to the aforementioned first aspect, apply mutatis mutandis to the method.

Optionally, the method further comprising delaying the first light beam and the second light beam by a first time period and a second time period, respectively. Optionally, the first time period and the second time period are equal. In an example, the first time period and the second time period may be equal to 30 nanoseconds. Alternatively, optionally, the first time period and the second time period are not equal.

Optionally, the first time period is shorter than the second time period.

In an example, the first time period may be equal to 40 nanoseconds, whereas the second time period is 60 nanoseconds. Alternatively, optionally, the second time period is shorter than the first time period. In an example, the second time period may be 25 nanoseconds, whereas the first time period may be equal to 45 nanoseconds.

Optionally, either of the first time period or the second time period is equal to zero. In this regard, either of the first time period or the second time period has no delay. It will be appreciated that the first time period and the second time period have a value greater than the minimum value of dead time of the SPAD, such that the detector element would be able to re-activate itself in-between detection of photons of the first light beam and photons of the second light beam.

Optionally, the method further comprises employing time-gated detection for measuring the spectral components of the Raman-scattered light.

DETAILED DESCRIPTION OF THE DRAWINGS

Referring to FIG. 1, illustrated is a block diagram of architecture of an apparatus 100 for measuring spectral components of Raman-scattered light emitted by a target 102, in accordance with an embodiment of the present disclosure. The apparatus 100 comprises a pulsed laser light source 104, probe optics 106, an optical spectrometer 108, and a detector element 110. The probe optics 106 comprises an excitation optics 112 and collection optics 114. The optical spectrometer 108 comprises an input divider 116, a first spectrograph 118, a second spectrograph 120, and a spatial light modulator 122, and at least one delay line (depicted as a delay line 124). The first spectrograph 118 comprises at least a first input aperture and a second input aperture, and an optical disperser 126. The second spectrograph 120 comprises an optical disperser, at least a first input aperture and a second input aperture, and at least a first output aperture and a second output aperture. The detector element 110 is configured as a time-resolved detector.

Figure 2:
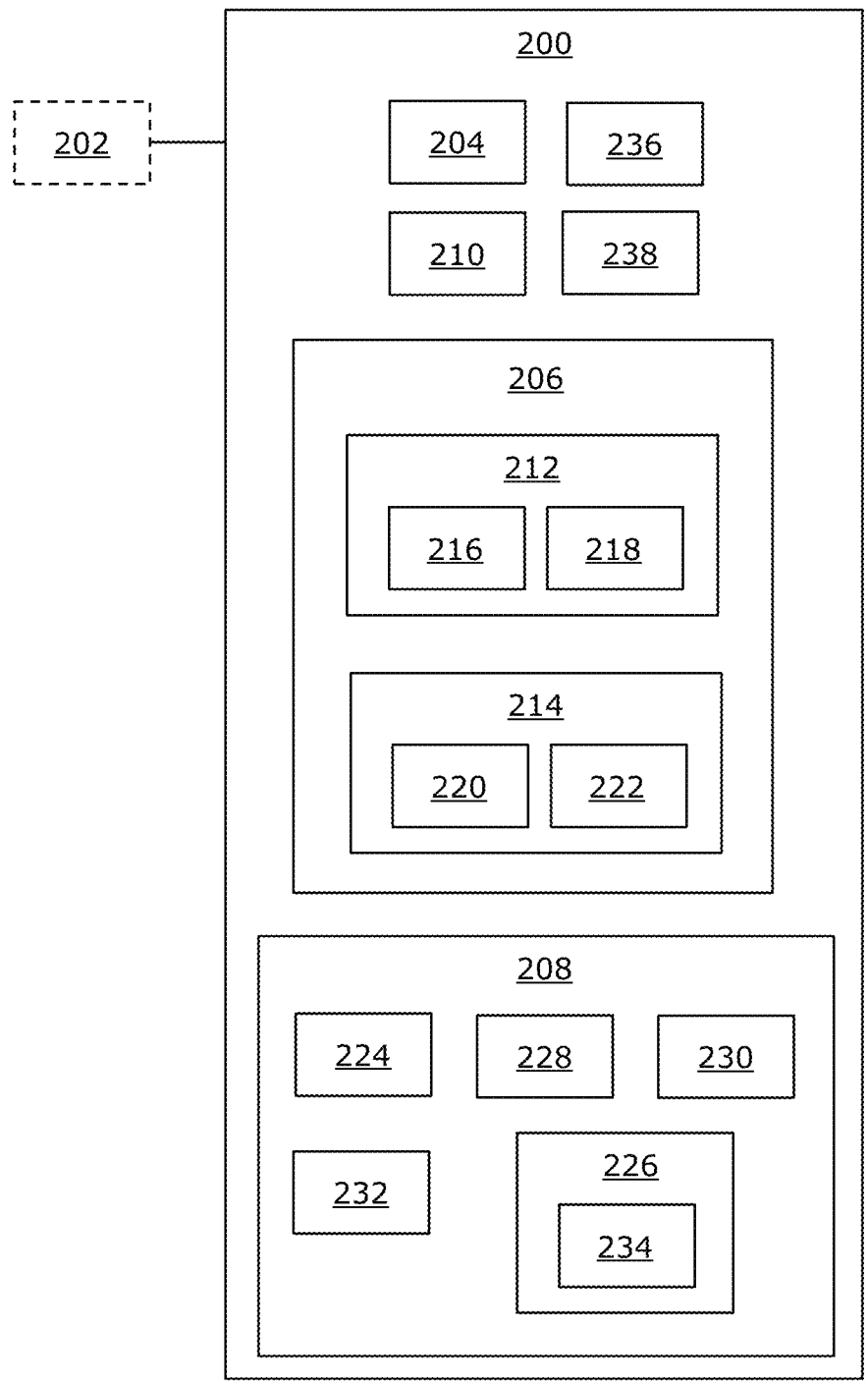

Referring to FIG. 2, illustrated is a block diagram of architecture of an apparatus 200 for measuring spectral components of Raman-scattered light emitted by a target 202, in accordance with another embodiment of the present disclosure. The apparatus 200 comprises a pulsed laser light source 204, probe optics 206, an optical spectrometer 208, and a detector element 210. The probe optics 206 comprises an excitation optics 212 and collection optics 214. The excitation optics 212 comprises a bandpass filter 216, and optical fibers 218. The collection optics 214 comprises at least one filter 220, and optical fibers 222. The optical spectrometer 208 comprises an input divider 224, a first spectrograph 226, a second spectrograph 228, and a spatial light modulator 230, and at least one delay line (depicted as a delay line 232). The first spectrograph 226 comprises at least a first input aperture and a second input aperture, and an optical disperser 234. The second spectrograph 228 comprises an optical disperser, at least a first input aperture and a second input aperture, and at least a first output aperture and a second output aperture. The apparatus 200 further comprises an output combiner 236 and a controller 238.

It may be understood by a person skilled in the art that FIG. 1 and FIG. 2 include simplified architectures of the apparatuses 100 and 200, respectively, for sake of clarity, which should not unduly limit the scope of the claims herein. The person skilled in the art will recognize many variations, alternatives, and modifications of embodiments of the present disclosure.

Figure 3:
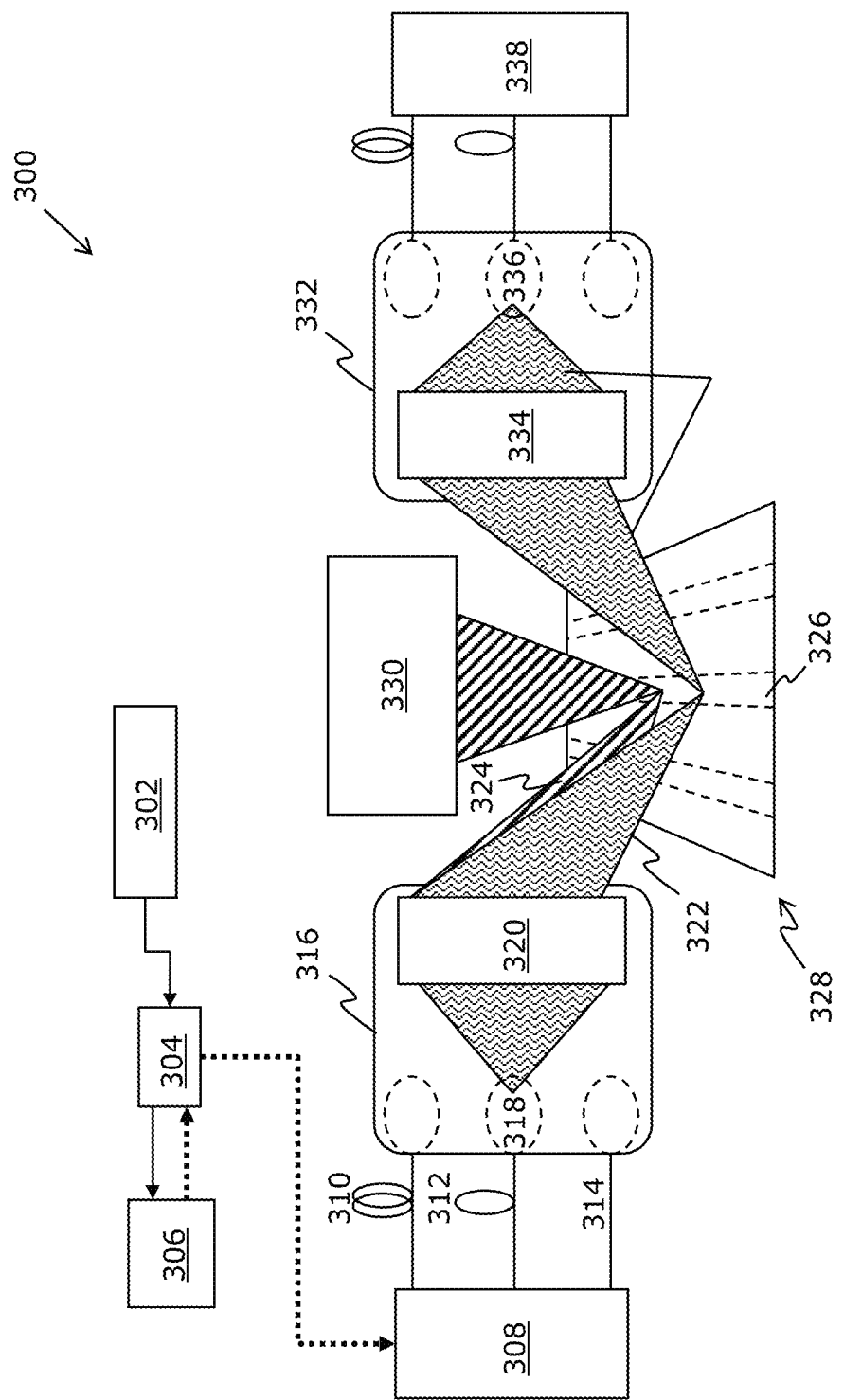
FIG. 3 is a schematic illustration of an apparatus for measuring spectral components of Raman-scattered light emitted by a target, in accordance with an embodiment of the present disclosure.

Referring to FIG. 3, illustrated is a schematic illustration of an apparatus 300 for measuring spectral components of Raman-scattered light emitted by a target, in accordance with an embodiment of the present disclosure. A pulsed laser light source 302 emits a laser light beam. A probe optics 304 directs the laser light beam towards a target 306. A light beam scattered and emitted by the target 306, said light beam being depicted as a dashed arrow, is collected by the probe optics 304. An input divider 308 divides the collected light beam, received from the probe optics 304, into three light beams, each light beam passing through respective delay lines 310, 312, and 314 arranged on an optical path between the input divider 308 and a first spectrograph 316. A length of the delay line 310 is greater than a length of the delay line 312, which is greater than a length of the delay line 314. Therefore, the delay line 310 introduces more delay than the delay line 312, whereas the delay line 312 introduces more delay than the delay line 314. The light beam in the delay line 312 is shown to be received at an input aperture 318 of the first spectrograph 316. An optical disperser 320 disperses this light beam angularly into two wavelength bands 322 and 324 (depicted as a wavy-hatch portion for the wavelength band 322 and slant-hatch portion for the wavelength band 324). The two wavelength bands 322 and 324 are shown to be received on a modulation area 326 of a spatial light modulator 328. Herein, the spatial light modulator 328 transmits the wavelength band 322, and dumps the wavelength band 324 into a beam dump 330. Thus, only the wavelength band 322 reaches a corresponding input aperture of a second spectrograph 332. Optics 334 of the second spectrograph 332 reverses dispersion of the wavelength band 322, and focus the light beam of this wavelength band to an output aperture 336 of the second spectrograph 332. The light beam emanating from the output aperture 336 reaches a detector element 338 whereat spectral components of the light beam are measured. Moreover, three delay lines on an optical path between the second spectrograph 332 and the detector element 338 provide different time delays to light beams emanating from different output apertures of the second spectrograph 332.

It may be understood by a person skilled in the art that FIG. 3 includes a simplified schematic illustration of the apparatus 300, for sake of clarity, which should not unduly limit the scope of the claims herein. The person skilled in the art will recognize many variations, alternatives, and modifications of embodiments of the present disclosure. In an example, the input divider 308 may divide the collected light beam into any number of light beams (for example, into two light beams). In another example, only a part of the wavelength band 322 may be transmitted by the spatial light modulator 328.

Figure 4:
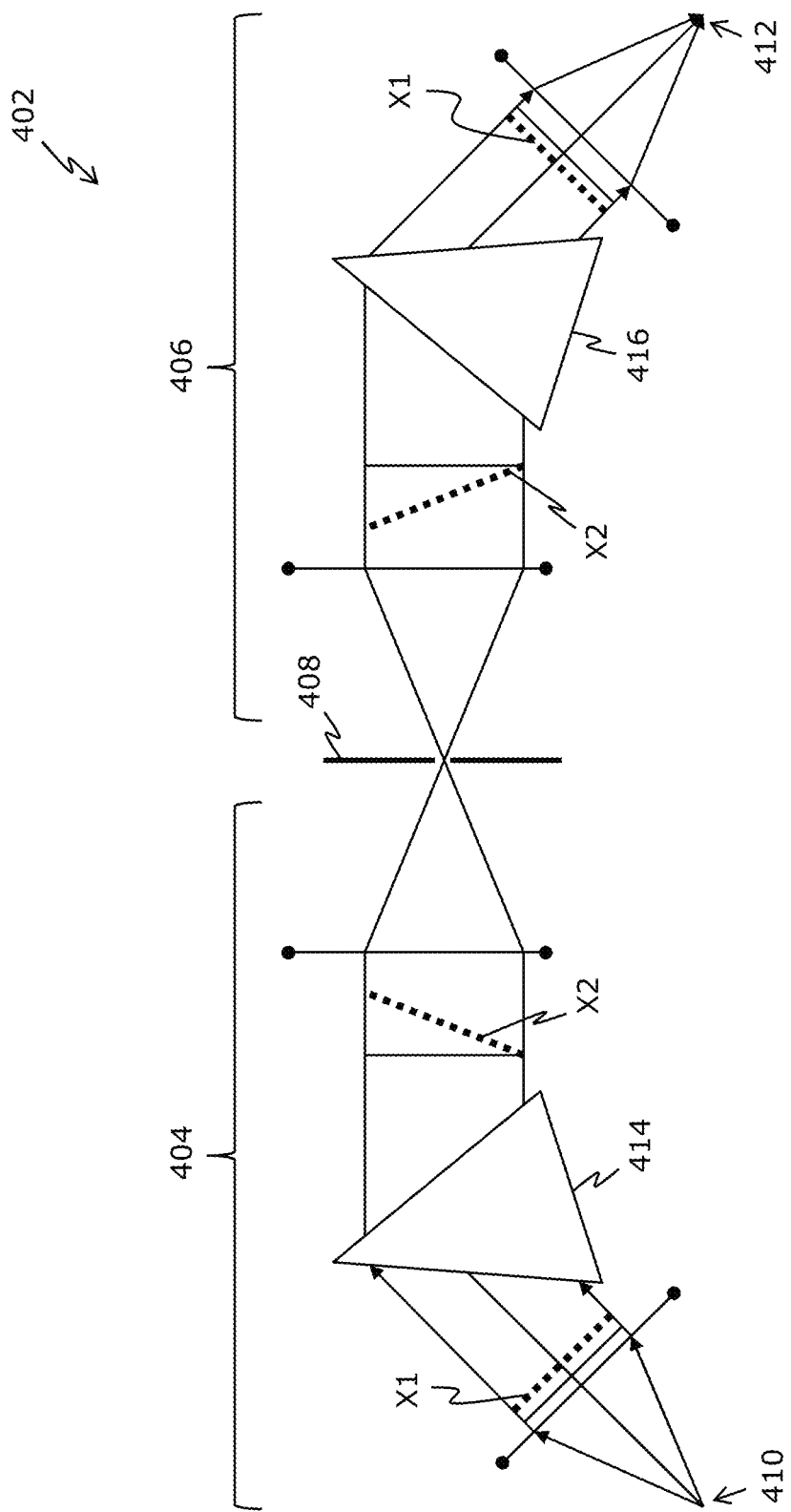
FIG. 4 illustrates how pulse front tilt cancellation occurs in an optical spectrometer, in accordance with an embodiment of the present disclosure.

Referring to FIG. 4, illustrated is how pulse front tilt cancellation occurs in an optical spectrometer 402, in accordance with an embodiment of the present disclosure. The optical spectrometer 402 is shown to comprise a first spectrograph 404, a second spectrograph 406, and a spatial light modulator 408. A light beam is shown to enter the optical spectrometer 402 at an input aperture 410 of the first spectrograph 404, and to exit the optical spectrometer 402 at an output aperture 412 of the second spectrograph 406. An optical disperser 414 of the first spectrograph 404 angularly disperses the light beam to change a pulse front of the light beam from a straight pulse front X1 to a tilted pulse front X2. This light beam passes through the spatial light modulator 408 to the second spectrograph 406. Optics 416 of the second spectrograph 406 perform the pulse front tilt cancellation by reversing the angular dispersion and the tilted pulse front X2 produced at the first spectrograph 404. As a result, the tilted pulse front X2 is changed to the straight pulse front X1 before the light beam exits the optical spectrometer 402.

Referring to FIG. 5A and 5B, FIG. 5A illustrates an etendue-splitting input divider, while FIG. 5B illustrates a spectrally-splitting input divider, in accordance with an embodiment of the present disclosure.

In FIG. 5A, a part of input etendue associated with optical fibers 502, 504, and 506 (depicted by dotted pattern) in an input optical fiber bundle 508 is lost (as a geometric spectral loss) since diameters of the optical fibers 502, 504, and 506 are greater than width 510 of input slit of a first spectrograph (not shown).

In FIG. 5B, a part of input etendue associated with an arrangement of the three images of the respective input optical fiber tip 512, 514, and 516 of the spectrally-splitting input divider is lost (as a geometric spectral loss) since diameters of the input optical fiber tips 512, 514, and 516 are greater than width 518 of input slit of the optical spectrometer (not shown). The arrangement of the input optical fiber tips 512, 514, and 516 is at an end of an input optical fiber bundle 520.

Referring to FIG. 6, illustrated is an exemplary combination of a spectrally-splitting input divider and an etendue-splitting input divider, in accordance with an embodiment of the present disclosure. Herein, spectral splitting occurs on an input optical fiber bundle 600, using an arrangement of input optical fiber tips 602, 604, and 606. Thereafter, three optical fiber bundles corresponding to each of the input optical fiber tips 602, 604, and 606 are employed for etendue splitting. The spectral splitting multiplies the input etendue by the number of the bundles.

Figure 7:
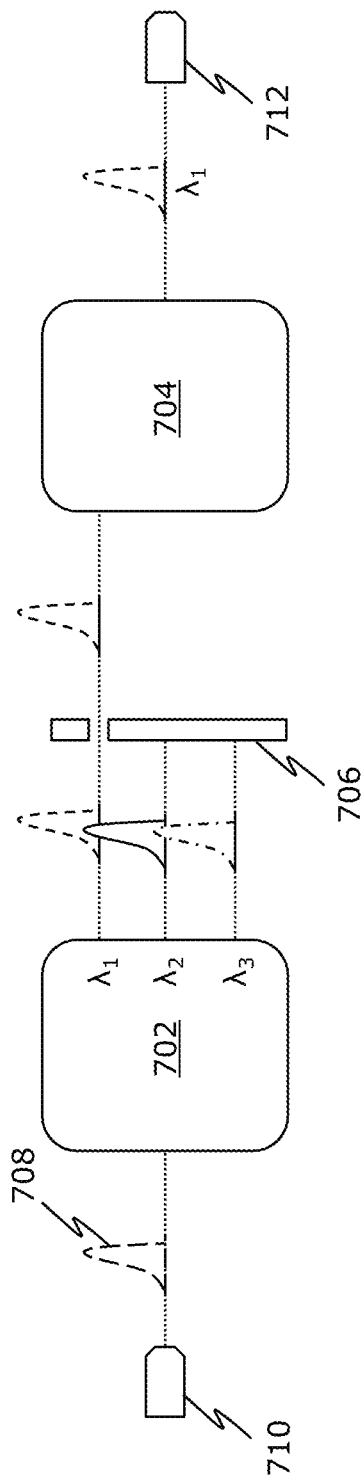
FIG. 7 illustrates an exemplary scenario in which an optical spectrometer is used in ideal conditions, in accordance with an embodiment of the present disclosure.

Referring to FIG. 7, illustrated is an exemplary scenario in which an optical spectrometer is used in ideal conditions, in accordance with an embodiment of the present disclosure. Herein, the optical spectrometer comprises a first spectrograph 702, a second spectrograph 704, and a spatial light modulator (SLM) 706. The first spectrograph 702 disperses a light pulse 708 coming from an input aperture 710 of the first spectrograph 702, into a continuum of wavelength bands $\lambda_1$ (depicted by dash pulse), $\lambda_2$ (depicted by solid pulse), and $\lambda_3$ (depicted by dash dot pulse). Herein, the SLM 706 is configured to transmit only the wavelength band $\lambda_1$ to an input aperture of the second spectrograph 704 and to block other wavelength bands $\lambda_2$ and $\lambda_3$. The second spectrograph 704 directs the wavelength band $\lambda_1$, to an output aperture 712 of the second spectrograph 704.

Figure 8:
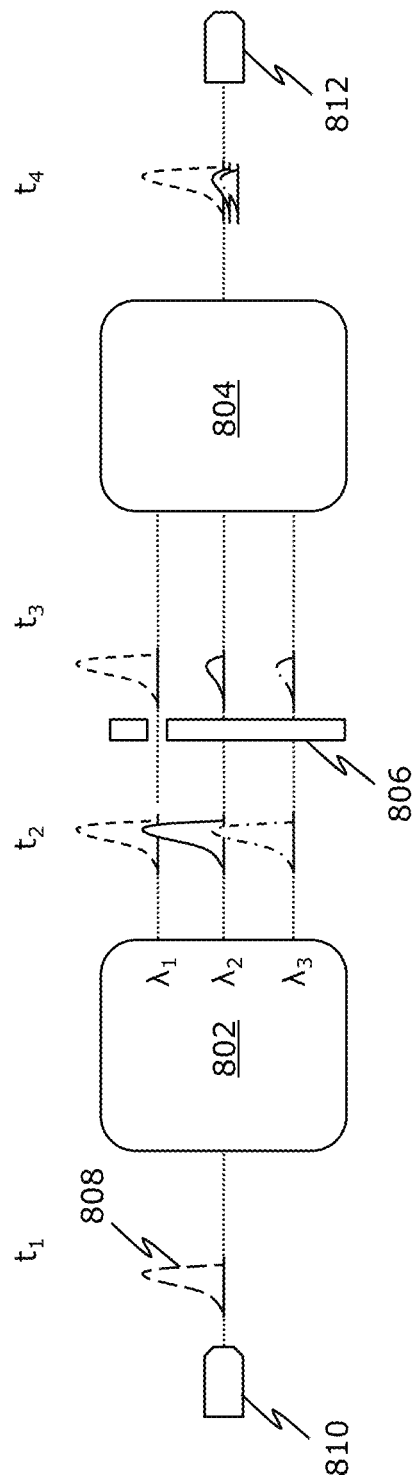
FIG. 8 illustrates an exemplary scenario in which an optical spectrometer is used in stray light conditions, in accordance with an embodiment of the present disclosure.

Referring to FIG. 8, illustrated is an exemplary scenario in which the inevitable presence of straylight from the SLM is explicitly taken into account, in accordance with an embodiment of the present disclosure, and as a correction to the simplified ideal situation depicted in FIG. 7. Herein, the optical spectrometer comprises a first spectrograph 802, a second spectrograph 804, and a spatial light modulator (SLM) 806. At a time $t_1$, a light pulse 808 (depicted by long dash pulse) from an input aperture 810 of the first spectrograph 802 enters the first spectrograph 802. At a time $t_2$, the first spectrograph 802 disperses the light pulse 808 into a continuum of wavelength bands $\lambda_1$ (depicted by dash pulse), $\lambda_2$ (depicted by solid pulse), and $\lambda_3$ (depicted by dash dot pulse). Light pulses corresponding to the wavelength bands $\lambda_1$, $\lambda_2$, and $\lambda_3$ are incident on the SLM 806 at different modulation areas. The SLM 806 is configured to transmit only the pulse incident at a modulation area corresponding to the wavelength band $\lambda_1$, and therefore at a time $t_3$, the light pulse corresponding to the wavelength band $\lambda_1$ is transmitted nearly undiminished through the SLM 806. However, due to the non-ideal conditions, some portions of pulses of the other wavelength bands $\lambda_2$ and $\lambda_3$ also get transmitted through the SLM 806 to enter as stray lights into the second spectrograph 804. At a time $t_4$, the second spectrograph 804 reverses angular dispersions of the wavelength band $\lambda_1$, and stray lights pertaining to the wavelength bands $\lambda_2$ and $\lambda_3$, and focuses the wavelength band $\lambda_1$ along with the stray lights to an output aperture 812 of the second spectrograph 804.

Figure 9A:
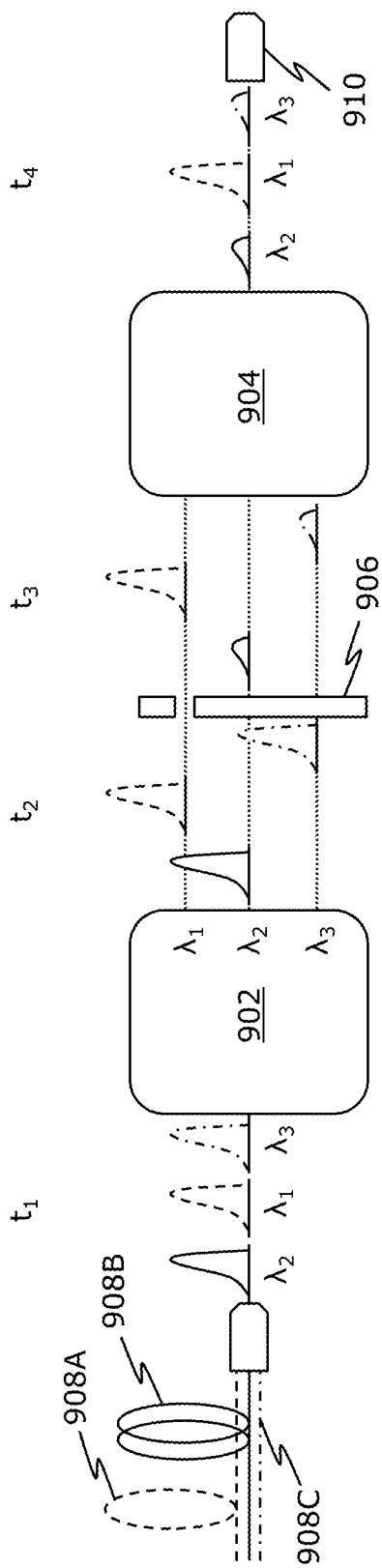
FIGS. 9A and 9B illustrate exemplary scenarios in which an optical spectrometer is used with delay lines and stray light conditions, in accordance with different embodiments of the present disclosure.
Figure 9B:
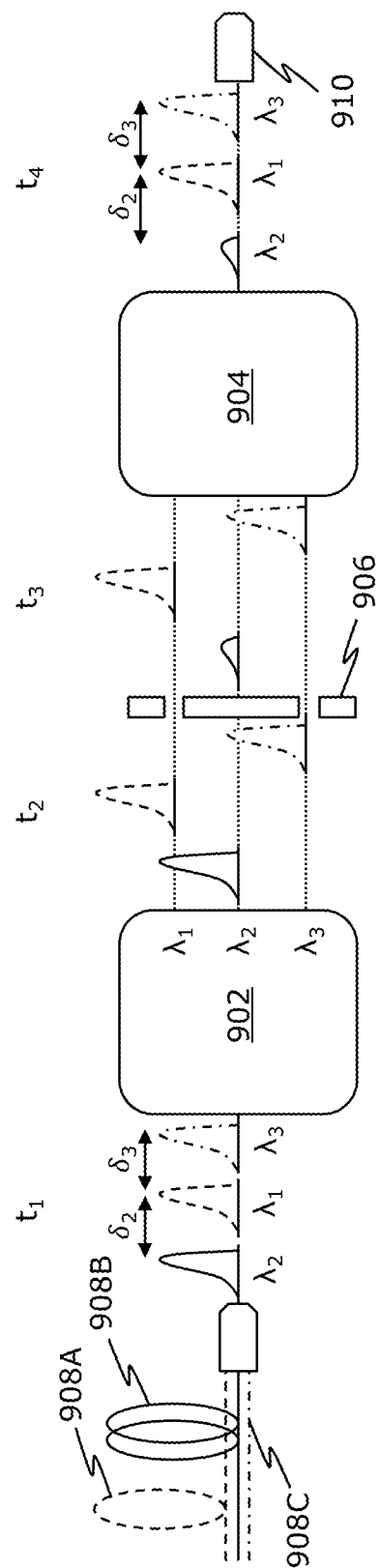

Referring to FIGS. 9A and 9B, illustrated are exemplary scenarios in which an optical spectrometer is used with delay lines and stray light conditions, in accordance with different embodiments of the present disclosure. In FIGS. 9A and 9B, the optical spectrometer comprises a first spectrograph 902, a second spectrograph 904, a spatial light modulator (SLM) 906, and three delay lines 908A, 908B, and 908C. Lengths of the three delay lines 908A, 908B, and 908C are indicated by a number of loops therein, where greater the number of loops, greater is a delay introduced by a given delay line. In case of no loops, no delay is introduced by the given delay line. The delay lines 908A, 908B, and 908C are implemented as three optical fibers carrying three light beams having wavelength bands $\lambda_1$ (depicted by dash pulse), $\lambda_2$ (depicted by solid pulse), and $\lambda_3$ (depicted by dash dot pulse), respectively. At a time $t_1$, the light beams corresponding to the wavelength bands $\lambda_1$, $\lambda_2$, and $\lambda_3$ propagate one behind another according to delays acquired in the delay lines 908A, 908B, and 908C, respectively to enter the first spectrograph 902.

In FIG. 9A, at a time $t_2$, each light pulse propagates towards the SLM 906. Herein, the SLM 906 is configured to transmit only the light pulse corresponding to the wavelength band $\lambda_1$. At a time $t_3$, intentionally transmitted wavelength band $\lambda_1$ and stray light pulses pertaining to the wavelength bands $\lambda_2$ and $\lambda_3$ enter the second spectrograph 904. At a time $t_4$, all the light pulses exit the second spectrograph 904 as a pulse train. Since a detector element (not shown), which is arranged beyond an output aperture 910, is time-resolving, unwanted stray light pulses of the wavelength bands $\lambda_2$ and $\lambda_3$ are easily discarded. Spectral components of the light pulse corresponding to the wavelength band $\lambda_1$ are accurately measured by the detector element.

In FIG. 9B, an inter-pulse delay between pulses of the wavelength band wavelength band $\lambda_1$ and the wavelength band $\lambda_2$ is represented as $\delta_2$. An inter-pulse delay between pulses of the wavelength band wavelength band $\lambda_2$ and the wavelength band $\lambda_3$ is represented as $\delta_3$. At a time $t_2$, each light pulse propagates towards the SLM 906. Herein, the SLM 906 is configured to transmit the light pulses corresponding to the wavelength band $\lambda_1$ and the wavelength band $\lambda_3$. At a time $t_3$, intentionally transmitted wavelength bands $\lambda_1$ and $\lambda_3$ with stray light pulse pertaining to the wavelength band $\lambda_2$ enter the second spectrograph 904. At a time $t_4$, all the light pulses exit the second spectrograph 904 as a pulse train. Since a detector element (not shown), which is arranged beyond an output aperture 910, is time-resolving, unwanted stray light pulse around the wavelength band $\lambda_2$ is discarded. The inter-pulse delay 83 is long enough for the detector element to be able to re-activate itself, after detecting a photon in the wavelength band $\lambda_3$, to be able to detect a photon in the wavelength band $\lambda_1$. Spectral components of the light pulse corresponding to the wavelength bands $\lambda_1$ and $\lambda_3$ are accurately measured by the detector element.

It may be understood by a person skilled in the art that FIGS. 9A and 9B depict simplified illustrations utilizing individual pulses of light beams merely for sake of clarity, which should not unduly limit the scope of the claims herein. The person skilled in the art will recognize many variations, alternatives, and modifications of embodiments of the present disclosure. In an example, the spatial light modulator 906 may be a reflective type spatial light modulator.

Figures 10A, 10B:
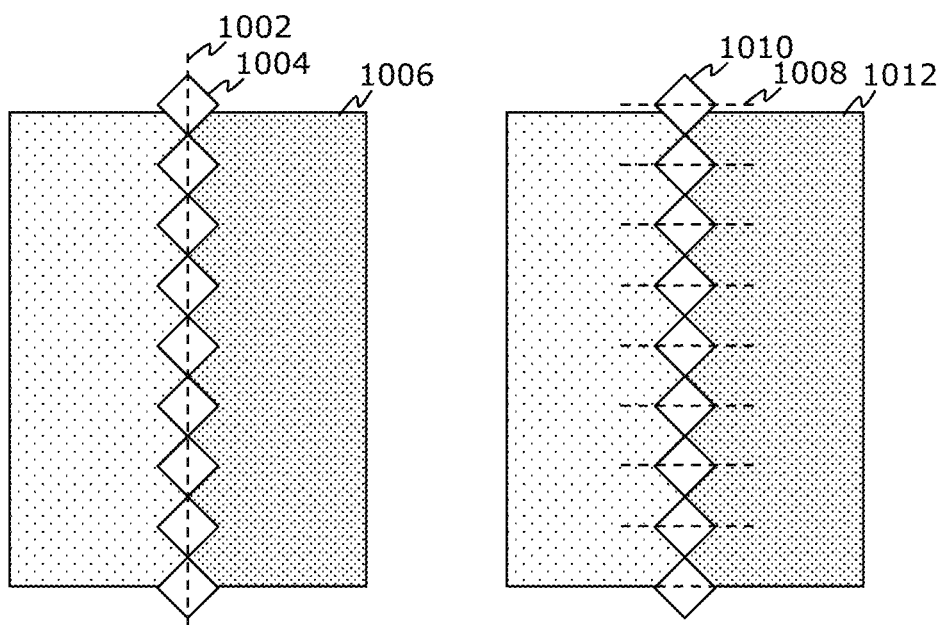
FIGS. 10A and 10B illustrate exemplary orientations of mirror tilt axis of a digital micromirror device, in accordance with an embodiment of the present disclosure.

Referring to FIGS. 10A and 10B, illustrated are exemplary orientations of mirror tilt axis of a micromirror in a digital micromirror device, in accordance with an embodiment of the present disclosure.

In FIG. 10A, the mirror tilt axis 1002 of a micromirror 1004 in the digital micromirror device including a plurality of micromirrors is shown to be perpendicular to orientation of a spectrum 1006, wherein the spectrum 1006 has a diagonal spectral orientation with respect to the micromirror 1004. In FIG. 10B, the mirror tilt axis 1008 of a micromirror 1010 in the digital micromirror device including a plurality of micromirrors is shown to be parallel to orientation of a spectrum 1012, wherein the spectrum 1012 has a diagonal spectral orientation.

Referring to FIGS. 11A and 11B, FIG. 11A illustrates an exemplary diagonal spectral orientation in a digital micromirror device 1102, while FIG. 11B illustrates an exemplary image of micromirror columns overlaid on an end of an output optical fiber 1104, in accordance with an embodiment of the present disclosure.

In FIG. 11A, there are shown two columns of micromirrors of the digital micromirror device 1102 at different spectral positions. A first column C1 and a second column C2 of micromirror corresponds to monochromatic spectral lines of wavelength $\lambda_1$ and $\lambda_2$, respectively, on surface of the digital micromirror device 1102. Widths (in direction of x-axis) of the spectral lines is expressed as $M_{1x}w_{SI}$, wherein $w_{SI}$ represents width of input slit of a first spectrograph. Heights of the spectral lines in spatial direction (in direction of y-axis) of the digital micromirror device 1102 is expressed as $M_{1y}D_{IF}$, which is also matched with height of the output optical fiber 1104, namely $M_{2y}^{-1}D_{OF}$. Herein, $D_{IF}$ is diameter of input optical fiber, and $D_{OF}$ is diameter of the output optical fiber 1104.

In FIG. 11B, for the wavelength $\lambda_1$, the micromirror column C1 that is used is in center of its corresponding input slit image (depicted as a slanted hatch rectangular portion on the digital micromirror device 1102). Alternatively, for the wavelength $\lambda_2$, the micromirror column C2 that is used is near one edge of its corresponding input slit image (depicted as a sleeping hatch rectangular portion on the digital micromirror device 1102).

Figure 12:
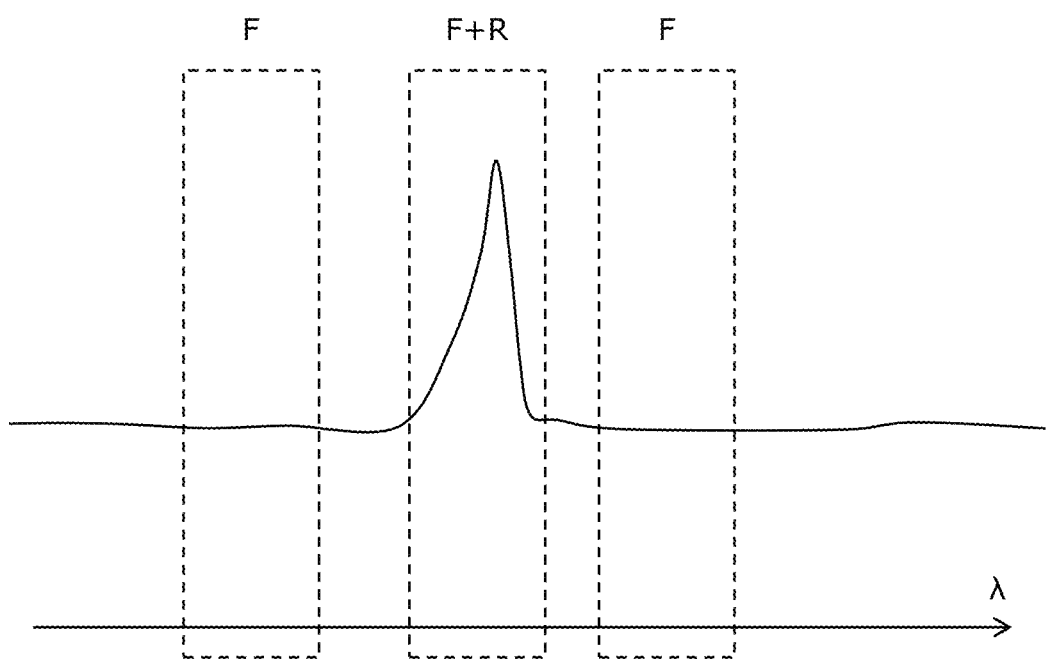
FIG. 12 illustrates a spectral sampling scheme used in duty cycle and signal-to-noise ratio calculations, in accordance with an embodiment of the present disclosure.

Referring to FIG. 12, illustrated is a spectral sampling scheme used in duty cycle and signal-to-noise ratio calculations, in accordance with an embodiment of the present disclosure. There is shown a simplified gated Raman signal (depicted as a peak) along with a residual fluorescence model (depicted as dashed boxes indicating residual fluorescence). There are shown two baseline points containing only residual fluorescence (labeled as 'F'), and one signal point containing both the Raman signal and a residual fluorescence. This signal point is labeled as 'F+R'.

Figure 13A:
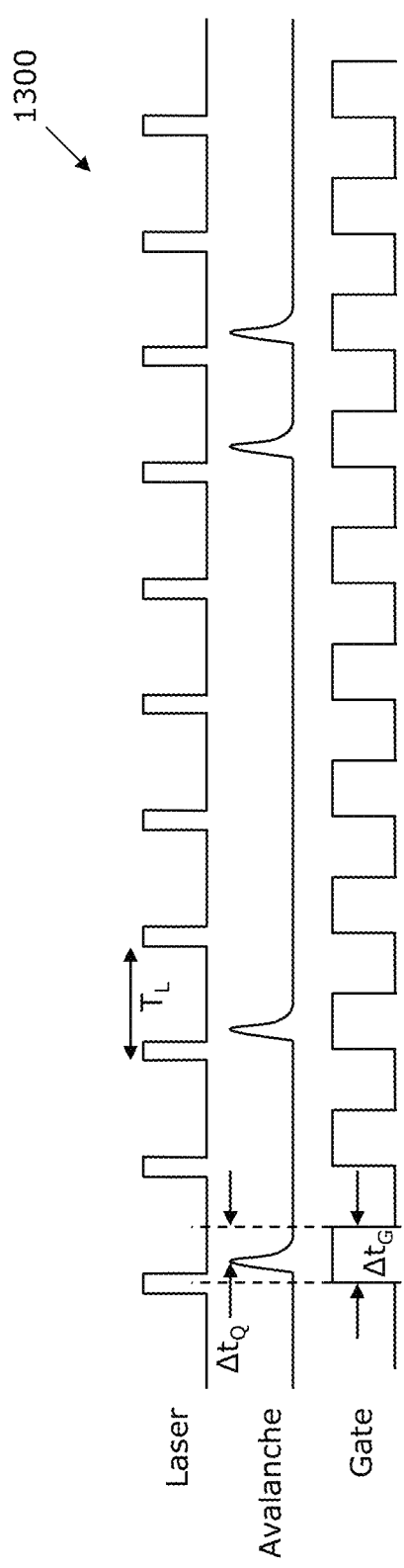
FIGS. 13A and 13B illustrate exemplary scenarios in which a single photon avalanche diode is used in a gated operation mode, in accordance with different embodiments of the present disclosure.
Figure 13B:
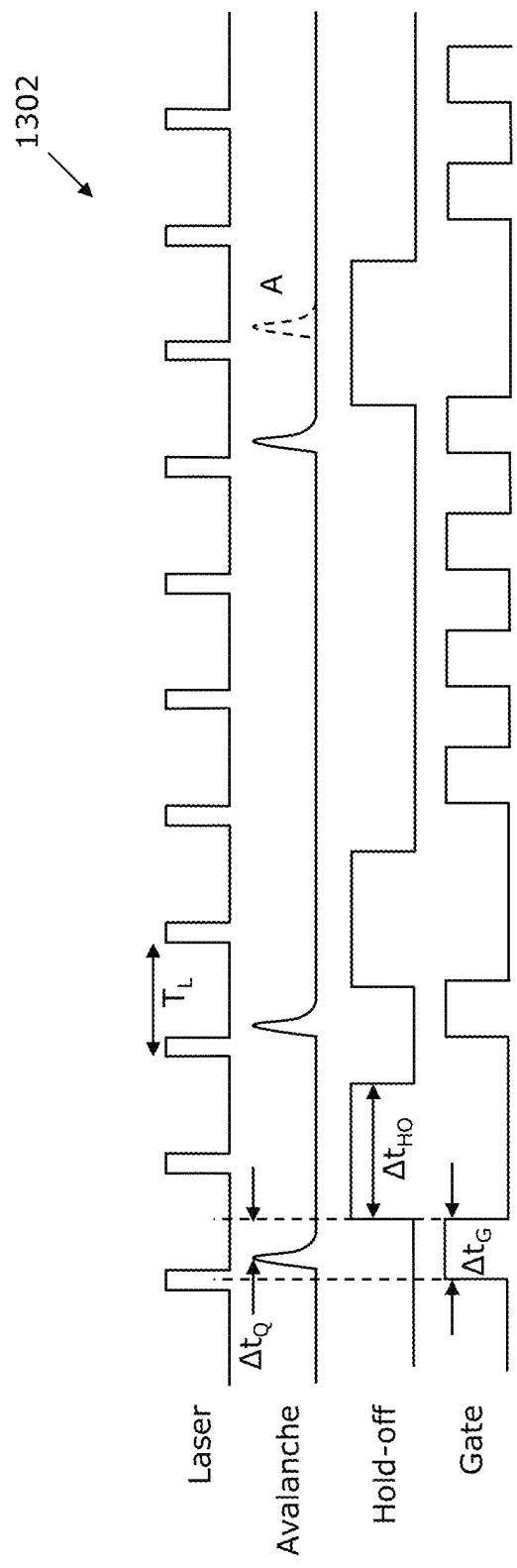

Referring to FIGS. 13A and 13B, illustrated are exemplary scenarios 1300 and 1302 in which a single photon avalanche diode is used in a gated operation mode, in accordance with different embodiments of the present disclosure. The scenarios 1300 and 1302 illustrate two qualitatively different gated modes of the gated operation mode.

In FIG. 13A, a hold-off time $\Delta t_{HO}$ relative to laser repetition period $T_L$ is minimal such that all pulses of light that are received at a detector element (not shown) potentially contribute to Raman signal. Therefore, each received pulse can be counted as quenching time $(\Delta t_Q)$ is much less than $T_L$. There is shown a received Raman signal having 4 counts of avalanches (contributing to the Raman signal) per 11 pulses emitted by a pulsed laser light source. These avalanches may be photogenerated or dark, because they occurred during gating time $\Delta t_G$.

In FIG. 13B, a hold-off time $\Delta t_{HO}$ relative to laser repetition period $T_L$ is considerably long such that few pulses of light that are received at a detector element (not shown) contribute to Raman signal. Therefore, each received pulse is not counted. There is shown a received Raman signal having 3 counts of avalanches (contributing to the Raman signal) per 11 pulses emitted by a pulsed laser light source. A dashed avalanche marked by "A" denotes a potential pulse count which is lost because it occurs during a hold-off period which is very long.

Figure 14A:
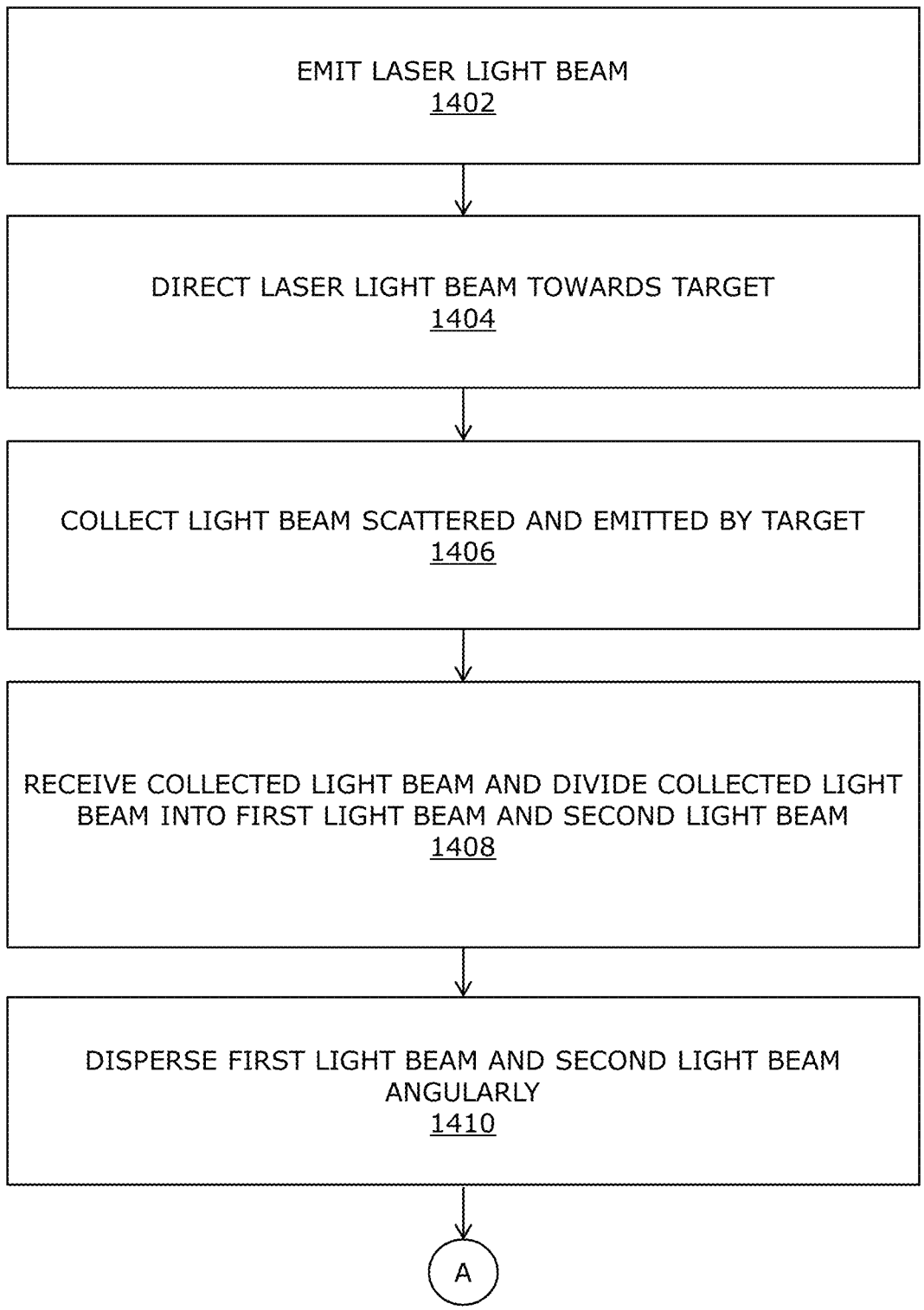
FIGS. 14A and 14B illustrate steps of a method for measuring spectral components of Raman scattered light emitted by a target, in accordance with an embodiment of the present disclosure.
Figure 14B:
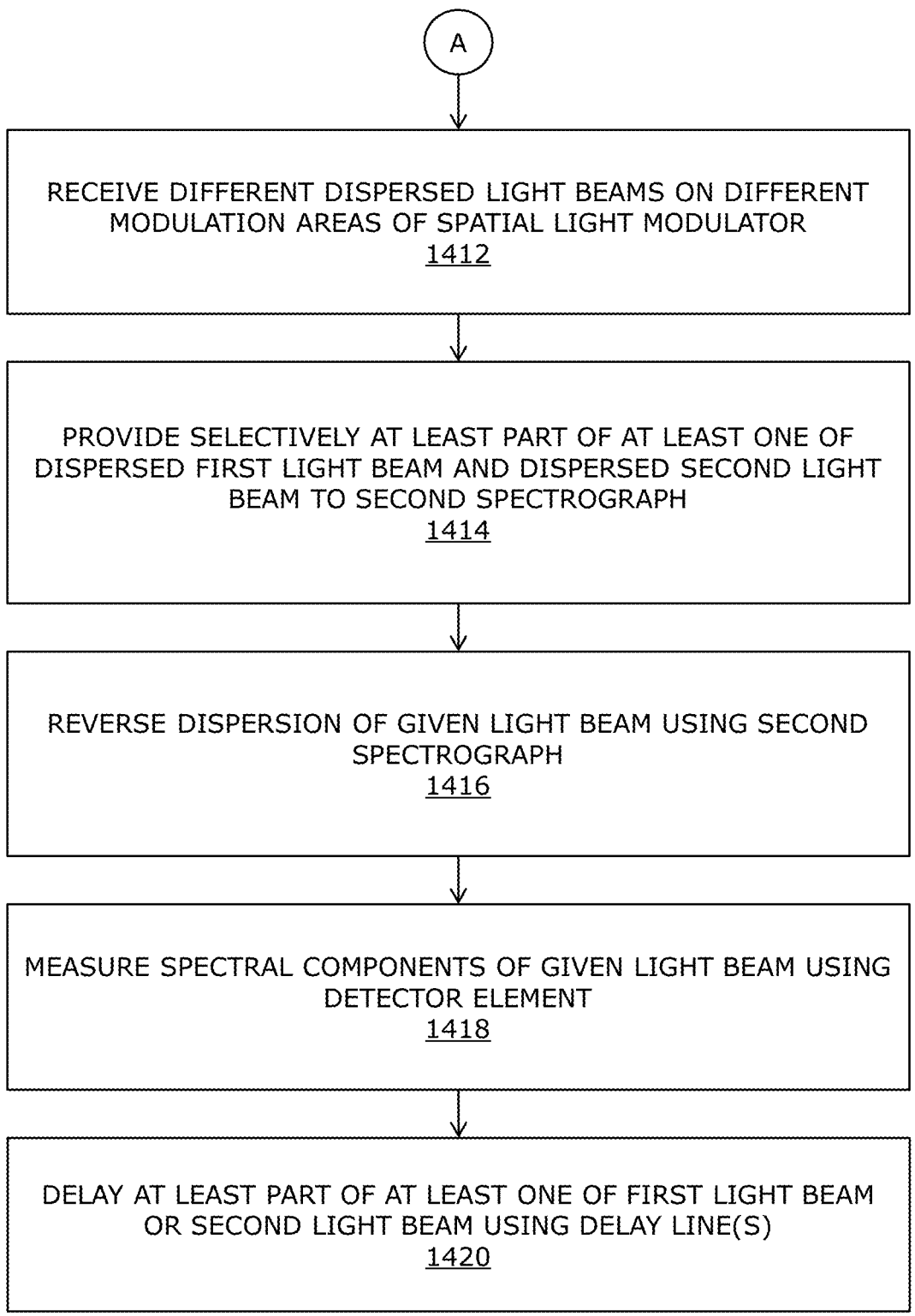

Referring to FIGS. 14A and 14B, illustrated are steps of a method for measuring spectral components of Raman scattered light emitted by a target, in accordance with an embodiment of the present disclosure. At step 1402, a laser light beam is emitted from a pulsed laser light source. At step 1404, the laser light beam is directed towards the target using excitation optics. At step 1406, the light beam scattered and emitted by the target is collected using collection optics. At step 1408, the collected light beam is received from the collection optics and the collected light beam is divided into at least a first light beam and a second light beam using an input divider. At step 1410, the first light beam and the second light beam are dispersed angularly using a first spectrograph. At step 1412, the dispersed first light beam and the dispersed second light beam are received on a first modulation area and a second modulation area of a spatial light modulator, respectively. At step 1414, at least a part of at least one of the dispersed first light beam and the dispersed second light beam is selectively provided to a second spectrograph. At step 1416, the dispersion of a given light beam is reversed using the second spectrograph. At step 1418, the spectral components of the given light beam emanating from the second spectrograph are measured using a detector element. At step 1420, at least a part of at least one of the first light beam or the second light beam is delayed using at least one delay line. The at least one delay line is arranged on at least one of an optical path between the input divider and the first spectrograph, and an optical path between the second spectrograph and the detector element.

The steps 1402, 1404, 1406, 1408, 1410, 1412, 1414, 1416, 1418, and 1420 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An apparatus for measuring spectral components of Raman-scattered light emitted by a target, the apparatus comprising:
    a pulsed laser light source that is employed to emit a laser light beam;
    probe optics comprising:
        excitation optics employed to direct the laser light beam towards the target; and
        collection optics employed to collect the light beam scattered and emitted by the target;
    an optical spectrometer comprising:
        an input divider employed to divide the collected light beam, received from the collection optics, into at least a first light beam and a second light beam;
        a first spectrograph comprising at least a first input aperture and a second input aperture for receiving the first light beam and the second light beam, respectively, and an optical disperser employed to disperse the first light beam and the second light beam angularly;
        a second spectrograph comprising at least a first input aperture and a second input aperture, and at least a first output aperture and a second output aperture; and
        a spatial light modulator comprising a two-dimensional array of pixels arranged to receive, from the optical disperser of the first spectrograph, the dispersed first light beam on a first modulation area and the dispersed second light beam on a second modulation area and to selectively provide at least a part of at least one of the dispersed first light beam and the dispersed second light beam to a corresponding input aperture of the second spectrograph, wherein the second spectrograph is employed to reverse the dispersion of a given light beam and focus the given light beam to a corresponding output aperture; and
    a time-resolved detector element employed to measure the spectral components of the given light beam emanating from the corresponding output aperture, wherein the optical spectrometer further comprises at least one delay line that is employed to delay at least a part of at least one of the first light beam or the second light beam, the at least one delay line being arranged on at least one of:
        an optical path between the input divider and the first spectrograph,
        an optical path between the second spectrograph and the time-resolved detector element.

2. The apparatus according to claim 1, further comprising an output combiner employed to combine the first light beam and the second light beam focused from the first output aperture and the second output aperture of the second spectrograph respectively.

3. The apparatus according to claim 1, wherein the excitation optics comprise a bandpass filter employed to spectrally clean up the emitted laser light beam before directing the laser light beam towards the target.

4. The apparatus according to claim 1, wherein the collection optics comprise at least one filter employed to reduce an amount of elastically scattered light present in the light beam scattered and emitted by the target.

5. The apparatus according to claim 1, wherein the excitation optics and/or the collection optics comprise optical fibers.

6. The apparatus according to claim 1, wherein the input divider comprises comprises a fiber bundle and/or an arrangement of dichroic filters.

7. The apparatus according to claim 1, wherein the at least one delay line is arranged on the optical path between the input divider and the first spectrograph, wherein the at least one delay line comprises fixed optical fibers or fiber bundles employed to convey at least one of the first light beam and the second light beam from the input divider to the first input aperture and the second input aperture of the first spectrograph, respectively, with any one of:
- a delay in at least part of at least one of the first light beam and the second light beam, or
- different delays in at least part of the first light beam and the second light beam.

8. The apparatus according to claim 1, wherein the at least one delay line is arranged on the optical path between the second spectrograph and the time-resolved detector element wherein the at least one delay line comprises fixed optical fibers or fiber bundles employed to convey the first light beam and the second light beam from the first output aperture and the second output aperture of the second spectrograph, respectively, to the time-resolved detector element with any one of:
- a delay in at least part of at least one of the first light beam and the second light beam, or
- different delays in at least part of the first light beam and the second light beam.

9. The apparatus according to claim 1, wherein a given modulation area of the spatial light modulator comprises at least two pixels, and wherein a given pixel is employed to either block or transmit a given light beam to a corresponding input aperture of the second spectrograph further wherein the apparatus comprises a controller configured to control the at least two pixels of the given modulation area of the spatial light modulator.

10. The apparatus according to claim 1, wherein the second spectrograph is the first spectrograph.

11. The apparatus according to claim 1, wherein the first light beam and the second light beam comprise at least a portion of a range of wavelengths present in the Raman-scattered light emitted by the target.

12. The apparatus according to claim 1, wherein the time-resolved detector element employs time-gated detection for measuring the spectral components of the Raman-scattered light.

13. The apparatus according to claim 1, wherein the time-resolved detector element is a single photon avalanche diode.

14. A method for measuring spectral components of Raman scattered light emitted by a target, the method comprising:
- emitting a laser light beam from a pulsed laser light source;
- directing the laser light beam towards the target using excitation optics;
- collecting the light beam scattered and emitted by the target using collection optics;
- receiving the collected light beam from the collection optics and dividing the collected light beam into at least a first light beam and a second light beam using an input divider;
- dispersing the first light beam and the second light beam angularly using a first spectrograph;
- receiving the dispersed first light beam and the dispersed second light beam on a first modulation area and a second modulation area of a spatial light modulator, respectively;
- providing selectively at least a part of at least one of the dispersed first light beam and the dispersed second light beam to a second spectrograph;
- reversing the dispersion of a given light beam using the second spectrograph; and
- measuring the spectral components of the given light beam emanating from the second spectrograph using a time-resolved detector element,
- wherein the method further comprises delaying at least a part of at least one of the first light beam or the second light beam using at least one delay line wherein the at least one delay line is arranged on at least one of:
  - an optical path between the input divider and the first spectrograph,
  - an optical path between the second spectrograph and the time-resolved detector element.

15. The method according to claim 14, further comprising delaying the first light beam and the second light beam by a first time period and a second time period, respectively.

16. The method according to claim 15, wherein the first time period is shorter than the second time period.

17. The method according to claim 14, further comprising employing time-gated detection for measuring the spectral components of the Raman-scattered light.

* * * * *